(12) United States Patent
Sengupta et al.

(10) Patent No.: US 11,799,324 B2
(45) Date of Patent: Oct. 24, 2023

(54) WIRELESS-POWER TRANSMITTING DEVICE FOR CREATING A UNIFORM NEAR-FIELD CHARGING AREA

(71) Applicant: Energous Corporation, San Jose, CA (US)

(72) Inventors: Sohini Sengupta, Milpitas, CA (US); Yunhong Liu, San Jose, CA (US); Tuomo Katajamaki, San Jose, CA (US)

(73) Assignee: Energous Corporation, San Jose, CA (US)

( * ) Notice: Subject to any disclaimer, the term of this patent is extended or adjusted under 35 U.S.C. 154(b) by 265 days.

(21) Appl. No.: 17/228,621

(22) Filed: Apr. 12, 2021

(65) Prior Publication Data

US 2021/0320529 A1    Oct. 14, 2021

Related U.S. Application Data

(60) Provisional application No. 63/009,361, filed on Apr. 13, 2020.

(51) Int. Cl.
*H02J 7/00* (2006.01)
*H02J 50/20* (2016.01)
(Continued)

(52) U.S. Cl.
CPC ............ *H02J 50/20* (2016.02); *H02J 7/0042* (2013.01); *H02J 7/02* (2013.01); *H02J 50/402* (2020.01);
(Continued)

(58) Field of Classification Search
None
See application file for complete search history.

(56) References Cited

U.S. PATENT DOCUMENTS 787,412 A    4/1905   Tesla
2,811,624 A  10/1957  Haagensen
(Continued)

FOREIGN PATENT DOCUMENTS

CN    201278367 Y    7/2009
CN    102227884 A    10/2011
(Continued)

OTHER PUBLICATIONS

Energous Corp., IPRP, PCT/US2014/040697, Dec. 8, 2015, 9 pgs.
(Continued)

*Primary Examiner* — Arun C Williams
(74) *Attorney, Agent, or Firm* — Morgan, Lewis & Bockius LLP

(57) ABSTRACT

An example near-field charging system includes a housing that includes a charging surface and at least one other surface, a radiating antenna, and a non-radiating element positioned above the radiating antenna within the housing such that the non-radiating element is closer to the charging surface than the radiating antenna. The radiating antenna produces a first electromagnetic-field distribution that is received by a receiver, the first electromagnetic-field provides usable power when the receiver is placed at any position on a first portion of the charging surface. The non-radiating element changes a distribution characteristic of the first electromagnetic-field distribution to produce a second electromagnetic-field distribution, the second electromagnetic-field distribution providing usable power to the receiver when the receiver is placed at any position across a second portion of the charging surface of the housing, and the second portion is at least 10% percent greater than the first portion.

18 Claims, 9 Drawing Sheets

(51) Int. Cl.
*H02J 7/02* (2016.01)
*H02J 50/40* (2016.01)
*H01Q 9/42* (2006.01)
*H01Q 9/04* (2006.01)
*H01Q 9/16* (2006.01)

(52) U.S. Cl.
CPC ............ *H01Q 9/0407* (2013.01); *H01Q 9/16* (2013.01); *H01Q 9/42* (2013.01)

(56) References Cited

U.S. PATENT DOCUMENTS

| | | | |
|---|---|---|---|
| 2,863,148 A | 12/1958 | Gammon et al. | |
| 3,167,775 A | 1/1965 | Guertler | |
| 3,434,678 A | 3/1969 | Brown et al. | |
| 3,696,384 A | 10/1972 | Lester | |
| 3,754,269 A | 8/1973 | Clavin | |
| 4,101,895 A | 7/1978 | Jones, Jr. | |
| 4,360,741 A | 11/1982 | Fitzsimmons et al. | |
| 4,944,036 A | 7/1990 | Hyatt | |
| 4,995,010 A | 2/1991 | Knight | |
| 5,142,292 A | 8/1992 | Chang | |
| 5,200,759 A | 4/1993 | McGinnis | |
| 5,211,471 A | 5/1993 | Rohrs | |
| 5,276,455 A | 1/1994 | Fitzsimmons et al. | |
| 5,548,292 A | 8/1996 | Hirshfield et al. | |
| 5,556,749 A | 9/1996 | Mitsuhashi et al. | |
| 5,568,088 A | 10/1996 | Dent et al. | |
| 5,631,572 A | 5/1997 | Sheen et al. | |
| 5,646,633 A | 7/1997 | Dahlberg | |
| 5,697,063 A | 12/1997 | Kishigami et al. | |
| 5,712,642 A | 1/1998 | Hulderman | |
| 5,936,527 A | 8/1999 | Isaacman et al. | |
| 5,982,139 A | 11/1999 | Parise | |
| 6,046,708 A | 4/2000 | MacDonald, Jr. et al. | |
| 6,061,025 A | 5/2000 | Jackson et al. | |
| 6,127,799 A | 10/2000 | Krishnan | |
| 6,127,942 A | 10/2000 | Welle | |
| 6,163,296 A | 12/2000 | Lier et al. | |
| 6,176,433 B1 | 1/2001 | Uesaka et al. | |
| 6,271,799 B1 | 8/2001 | Rief | |
| 6,289,237 B1 | 9/2001 | Mickle et al. | |
| 6,329,908 B1 | 12/2001 | Frecska | |
| 6,400,586 B2 | 6/2002 | Raddi et al. | |
| 6,421,235 B2 | 7/2002 | Ditzik | |
| 6,437,685 B2 | 8/2002 | Hanaki | |
| 6,456,253 B1 | 9/2002 | Rummeli et al. | |
| 6,476,795 B1 | 11/2002 | Derocher et al. | |
| 6,501,414 B2 | 12/2002 | Arndt et al. | |
| 6,583,723 B2 | 6/2003 | Watanabe et al. | |
| 6,597,897 B2 | 7/2003 | Tang | |
| 6,615,074 B2 | 9/2003 | Mickle et al. | |
| 6,650,376 B1 | 11/2003 | Obitsu | |
| 6,664,920 B1 | 12/2003 | Mott et al. | |
| 6,680,700 B2 | 1/2004 | Hilgers | |
| 6,798,716 B1 | 9/2004 | Charych | |
| 6,803,744 B1 | 10/2004 | Sabo | |
| 6,853,197 B1 | 2/2005 | McFarland | |
| 6,856,291 B2 | 2/2005 | Mickle et al. | |
| 6,911,945 B2 | 6/2005 | Korva | |
| 6,960,968 B2 | 11/2005 | Odendaal et al. | |
| 6,967,462 B1 | 11/2005 | Landis | |
| 6,988,026 B2 | 1/2006 | Breed et al. | |
| 7,003,350 B2 | 2/2006 | Denker et al. | |
| 7,012,572 B1 | 3/2006 | Schaffner et al. | |
| 7,027,311 B2 | 4/2006 | Vanderelli et al. | |
| 7,068,234 B2 | 6/2006 | Sievenpiper | |
| 7,068,991 B2 | 6/2006 | Parise | |
| 7,079,079 B2 | 7/2006 | Jo et al. | |
| 7,183,748 B1 | 2/2007 | Unno et al. | |
| 7,191,013 B1 | 3/2007 | Miranda et al. | |
| 7,193,644 B2 | 3/2007 | Carter | |
| 7,196,663 B2 | 3/2007 | Bolzer et al. | |
| 7,205,749 B2 | 4/2007 | Hagen et al. | |
| 7,215,296 B2 | 5/2007 | Abramov et al. | |
| 7,222,356 B1 | 5/2007 | Yonezawa et al. | |
| 7,274,334 B2 | 9/2007 | O'Riordan et al. | |
| 7,274,336 B2 | 9/2007 | Carson | |
| 7,351,975 B2 | 4/2008 | Brady et al. | |
| 7,359,730 B2 | 4/2008 | Dennis et al. | |
| 7,372,408 B2 | 5/2008 | Gaucher | |
| 7,392,068 B2 | 6/2008 | Dayan | |
| 7,403,803 B2 | 7/2008 | Mickle et al. | |
| 7,443,057 B2 | 10/2008 | Nunally | |
| 7,451,839 B2 | 11/2008 | Perlman | |
| 7,463,201 B2 | 12/2008 | Chiang et al. | |
| 7,471,247 B2 | 12/2008 | Saily | |
| 7,535,195 B1 | 5/2009 | Horovitz et al. | |
| 7,614,556 B2 | 11/2009 | Overhultz et al. | |
| 7,639,994 B2 | 12/2009 | Greene et al. | |
| 7,643,312 B2 | 1/2010 | Vanderelli et al. | |
| 7,652,577 B1 | 1/2010 | Madhow et al. | |
| 7,679,576 B2 | 3/2010 | Riedel et al. | |
| 7,702,771 B2 | 4/2010 | Ewing et al. | |
| 7,786,419 B2 | 8/2010 | Hyde et al. | |
| 7,812,771 B2 | 10/2010 | Greene et al. | |
| 7,830,312 B2 | 11/2010 | Choudhury et al. | |
| 7,844,306 B2 | 11/2010 | Shearer et al. | |
| 7,868,482 B2 | 1/2011 | Greene et al. | |
| 7,898,105 B2 | 3/2011 | Greene et al. | |
| 7,904,117 B2 | 3/2011 | Doan et al. | |
| 7,911,386 B1 | 3/2011 | Ito et al. | |
| 7,925,308 B2 | 4/2011 | Greene et al. | |
| 7,948,208 B2 | 5/2011 | Partovi et al. | |
| 8,049,676 B2 * | 11/2011 | Yoon | H01Q 1/243 343/895 |
| 8,055,003 B2 | 11/2011 | Mittleman et al. | |
| 8,070,595 B2 | 12/2011 | Alderucci et al. | |
| 8,072,380 B2 | 12/2011 | Crouch | |
| 8,092,301 B2 | 1/2012 | Alderucci et al. | |
| 8,099,140 B2 | 1/2012 | Arai | |
| 8,115,448 B2 | 2/2012 | John | |
| 8,159,090 B2 | 4/2012 | Greene et al. | |
| 8,159,364 B2 | 4/2012 | Zeine | |
| 8,180,286 B2 | 5/2012 | Yamasuge | |
| 8,184,454 B2 | 5/2012 | Mao | |
| 8,228,194 B2 | 7/2012 | Mickle | |
| 8,234,509 B2 | 7/2012 | Gioscia et al. | |
| 8,264,101 B2 | 9/2012 | Hyde et al. | |
| 8,264,291 B2 | 9/2012 | Morita | |
| 8,276,325 B2 | 10/2012 | Clifton et al. | |
| 8,278,784 B2 | 10/2012 | Cook et al. | |
| 8,284,101 B2 | 10/2012 | Fusco | |
| 8,310,201 B1 | 11/2012 | Wright | |
| 8,338,991 B2 | 12/2012 | Von Novak et al. | |
| 8,362,745 B2 | 1/2013 | Tinaphong | |
| 8,380,255 B2 | 2/2013 | Shearer et al. | |
| 8,384,600 B2 | 2/2013 | Huang et al. | |
| 8,410,953 B2 | 4/2013 | Zeine | |
| 8,411,963 B2 | 4/2013 | Luff | |
| 8,432,062 B2 | 4/2013 | Greene et al. | |
| 8,432,071 B2 | 4/2013 | Huang et al. | |
| 8,446,248 B2 | 5/2013 | Zeine | |
| 8,447,234 B2 | 5/2013 | Cook et al. | |
| 8,451,189 B1 | 5/2013 | Fluhler | |
| 8,452,235 B2 | 5/2013 | Kirby et al. | |
| 8,457,656 B2 | 6/2013 | Perkins et al. | |
| 8,461,817 B2 | 6/2013 | Martin et al. | |
| 8,467,733 B2 | 6/2013 | Leabman | |
| 8,497,601 B2 | 7/2013 | Hall et al. | |
| 8,497,658 B2 | 7/2013 | Von Novak et al. | |
| 8,552,597 B2 | 8/2013 | Song et al. | |
| 8,558,661 B2 | 10/2013 | Zeine | |
| 8,560,026 B2 | 10/2013 | Chanterac | |
| 8,564,485 B2 | 10/2013 | Milosavljevic et al. | |
| 8,604,746 B2 | 12/2013 | Lee | |
| 8,614,643 B2 | 12/2013 | Leabman | |
| 8,621,245 B2 | 12/2013 | Shearer et al. | |
| 8,626,249 B2 | 1/2014 | Kuusilinna et al. | |
| 8,629,576 B2 | 1/2014 | Levine | |
| 8,653,966 B2 | 2/2014 | Rao et al. | |
| 8,655,272 B2 | 2/2014 | Saunamäki | |
| 8,674,551 B2 | 3/2014 | Low et al. | |
| 8,686,685 B2 | 4/2014 | Moshfeghi | |

(56) References Cited

U.S. PATENT DOCUMENTS

| | | | |
|---|---|---|---|
| 8,686,905 B2 * | 4/2014 | Shtrom | H01Q 1/38 343/702 |
| 8,712,355 B2 | 4/2014 | Black et al. | |
| 8,712,485 B2 | 4/2014 | Tam | |
| 8,718,773 B2 | 5/2014 | Wills et al. | |
| 8,729,737 B2 | 5/2014 | Schatz et al. | |
| 8,736,228 B1 | 5/2014 | Freed et al. | |
| 8,760,113 B2 | 6/2014 | Keating | |
| 8,770,482 B2 | 7/2014 | Ackermann et al. | |
| 8,772,960 B2 | 7/2014 | Yoshida | |
| 8,823,319 B2 | 9/2014 | Von Novak, III et al. | |
| 8,832,646 B1 | 9/2014 | Wendling | |
| 8,854,176 B2 | 10/2014 | Zeine | |
| 8,860,364 B2 | 10/2014 | Low et al. | |
| 8,897,770 B1 | 11/2014 | Frolov et al. | |
| 8,903,456 B2 | 12/2014 | Chu et al. | |
| 8,917,057 B2 | 12/2014 | Hui | |
| 8,923,189 B2 | 12/2014 | Leabman | |
| 8,928,544 B2 | 1/2015 | Massie et al. | |
| 8,937,408 B2 | 1/2015 | Ganem et al. | |
| 8,946,940 B2 | 2/2015 | Kim et al. | |
| 8,963,486 B2 | 2/2015 | Kirby et al. | |
| 8,970,070 B2 | 3/2015 | Sada et al. | |
| 8,989,053 B1 | 3/2015 | Skaaksrud et al. | |
| 9,000,616 B2 | 4/2015 | Greene et al. | |
| 9,001,622 B2 | 4/2015 | Perry | |
| 9,006,934 B2 | 4/2015 | Kozakai et al. | |
| 9,021,277 B2 | 4/2015 | Shearer et al. | |
| 9,030,161 B2 | 5/2015 | Lu et al. | |
| 9,059,598 B2 | 6/2015 | Kang et al. | |
| 9,059,599 B2 | 6/2015 | Won et al. | |
| 9,077,188 B2 | 7/2015 | Moshfeghi | |
| 9,083,595 B2 | 7/2015 | Rakib et al. | |
| 9,088,216 B2 | 7/2015 | Garrity et al. | |
| 9,124,125 B2 | 9/2015 | Leabman et al. | |
| 9,130,397 B2 | 9/2015 | Leabman et al. | |
| 9,130,602 B2 | 9/2015 | Cook | |
| 9,142,998 B2 | 9/2015 | Yu et al. | |
| 9,143,000 B2 | 9/2015 | Leabman et al. | |
| 9,143,010 B2 | 9/2015 | Urano | |
| 9,153,074 B2 | 10/2015 | Zhou et al. | |
| 9,178,389 B2 | 11/2015 | Hwang | |
| 9,225,196 B2 | 12/2015 | Huang et al. | |
| 9,240,469 B2 | 1/2016 | Sun et al. | |
| 9,242,411 B2 | 1/2016 | Kritchman et al. | |
| 9,244,500 B2 | 1/2016 | Cain et al. | |
| 9,252,628 B2 | 2/2016 | Leabman et al. | |
| 9,270,344 B2 | 2/2016 | Rosenberg | |
| 9,276,329 B2 | 3/2016 | Jones et al. | |
| 9,282,582 B1 | 3/2016 | Dunsbergen et al. | |
| 9,294,840 B1 | 3/2016 | Anderson et al. | |
| 9,297,896 B1 | 3/2016 | Andrews | |
| 9,318,898 B2 | 4/2016 | John | |
| 9,368,020 B1 | 6/2016 | Bell et al. | |
| 9,401,977 B1 | 7/2016 | Gaw | |
| 9,409,490 B2 | 8/2016 | Kawashima | |
| 9,419,335 B2 | 8/2016 | Pintos | |
| 9,419,443 B2 | 8/2016 | Leabman | |
| 9,438,045 B1 | 9/2016 | Leabman | |
| 9,438,046 B1 | 9/2016 | Leabman | |
| 9,444,283 B2 | 9/2016 | Son et al. | |
| 9,450,449 B1 | 9/2016 | Leabman et al. | |
| 9,461,502 B2 | 10/2016 | Lee et al. | |
| 9,520,725 B2 | 12/2016 | Masaoka et al. | |
| 9,520,748 B2 | 12/2016 | Hyde et al. | |
| 9,522,270 B2 | 12/2016 | Perryman et al. | |
| 9,532,748 B2 | 1/2017 | Denison et al. | |
| 9,537,354 B2 | 1/2017 | Bell et al. | |
| 9,537,357 B2 | 1/2017 | Leabman | |
| 9,537,358 B2 | 1/2017 | Leabman | |
| 9,538,382 B2 | 1/2017 | Bell et al. | |
| 9,544,640 B2 | 1/2017 | Lau | |
| 9,559,553 B2 | 1/2017 | Bae | |
| 9,564,773 B2 | 2/2017 | Pogorelik et al. | |
| 9,571,974 B2 | 2/2017 | Choi et al. | |
| 9,590,317 B2 | 3/2017 | Zimmerman et al. | |
| 9,590,444 B2 | 3/2017 | Walley | |
| 9,620,996 B2 | 4/2017 | Zeine | |
| 9,647,328 B2 | 5/2017 | Dobric | |
| 9,706,137 B2 | 7/2017 | Scanlon et al. | |
| 9,711,999 B2 | 7/2017 | Hietala et al. | |
| 9,723,635 B2 | 8/2017 | Nambord et al. | |
| 9,793,758 B2 | 10/2017 | Leabman | |
| 9,793,764 B2 | 10/2017 | Perry | |
| 9,800,080 B2 | 10/2017 | Leabman et al. | |
| 9,800,172 B1 | 10/2017 | Leabman | |
| 9,806,564 B2 | 10/2017 | Leabman | |
| 9,819,230 B2 | 11/2017 | Petras et al. | |
| 9,824,815 B2 | 11/2017 | Leabman et al. | |
| 9,825,674 B1 | 11/2017 | Leabman | |
| 9,831,718 B2 | 11/2017 | Leabman et al. | |
| 9,838,083 B2 | 12/2017 | Bell et al. | |
| 9,843,213 B2 | 12/2017 | Leabman et al. | |
| 9,843,229 B2 | 12/2017 | Leabman | |
| 9,843,763 B2 | 12/2017 | Leabman et al. | |
| 9,847,669 B2 | 12/2017 | Leabman | |
| 9,847,677 B1 | 12/2017 | Leabman | |
| 9,847,679 B2 | 12/2017 | Bell et al. | |
| 9,853,361 B2 | 12/2017 | Chen et al. | |
| 9,853,692 B1 | 12/2017 | Bell et al. | |
| 9,859,756 B2 | 1/2018 | Leabman et al. | |
| 9,859,758 B1 | 1/2018 | Leabman | |
| 9,866,279 B2 | 1/2018 | Bell et al. | |
| 9,867,032 B2 | 1/2018 | Verma et al. | |
| 9,871,301 B2 | 1/2018 | Contopanagos | |
| 9,876,380 B1 | 1/2018 | Leabman et al. | |
| 9,876,394 B1 | 1/2018 | Leabman | |
| 9,876,536 B1 | 1/2018 | Bell et al. | |
| 9,876,648 B2 | 1/2018 | Bell | |
| 9,882,394 B1 | 1/2018 | Bell et al. | |
| 9,882,413 B2 * | 1/2018 | Jeong | H02J 7/04 |
| 9,882,427 B2 | 1/2018 | Leabman et al. | |
| 9,887,584 B1 | 2/2018 | Bell et al. | |
| 9,887,739 B2 | 2/2018 | Leabman et al. | |
| 9,891,669 B2 | 2/2018 | Bell | |
| 9,893,554 B2 | 2/2018 | Bell et al. | |
| 9,893,555 B1 | 2/2018 | Leabman et al. | |
| 9,893,564 B2 | 2/2018 | de Rochemont | |
| 9,899,744 B1 | 2/2018 | Contopanagos et al. | |
| 9,899,844 B1 | 2/2018 | Bell et al. | |
| 9,899,861 B1 | 2/2018 | Leabman et al. | |
| 9,899,873 B2 | 2/2018 | Bell et al. | |
| 9,912,199 B2 | 3/2018 | Leabman et al. | |
| 9,916,485 B1 | 3/2018 | Lilly et al. | |
| 9,917,477 B1 | 3/2018 | Bell et al. | |
| 9,923,386 B1 | 3/2018 | Leabman et al. | |
| 9,939,864 B1 | 4/2018 | Bell et al. | |
| 9,941,747 B2 | 4/2018 | Bell et al. | |
| 9,965,009 B1 | 5/2018 | Bell et al. | |
| 9,966,765 B1 | 5/2018 | Leabman | |
| 9,966,784 B2 | 5/2018 | Leabman | |
| 9,967,743 B1 | 5/2018 | Bell et al. | |
| 9,973,008 B1 | 5/2018 | Leabman | |
| 10,003,211 B1 | 6/2018 | Leabman et al. | |
| 10,008,777 B1 | 6/2018 | Broyde et al. | |
| 10,008,889 B2 | 6/2018 | Bell et al. | |
| 10,014,728 B1 | 7/2018 | Leabman | |
| 10,027,159 B2 | 7/2018 | Hosseini | |
| 10,038,337 B1 | 7/2018 | Leabman et al. | |
| 10,050,462 B1 | 8/2018 | Leabman et al. | |
| 10,056,782 B1 | 8/2018 | Leabman | |
| 10,063,064 B1 | 8/2018 | Bell et al. | |
| 10,063,105 B2 | 8/2018 | Leabman | |
| 10,063,106 B2 | 8/2018 | Bell et al. | |
| 10,068,703 B1 | 9/2018 | Contopanagos | |
| 10,075,008 B1 | 9/2018 | Bell et al. | |
| 10,079,515 B2 | 9/2018 | Hosseini et al. | |
| 10,090,699 B1 | 10/2018 | Leabman | |
| 10,090,714 B2 | 10/2018 | Bohn et al. | |
| 10,090,886 B1 | 10/2018 | Bell et al. | |
| 10,103,552 B1 | 10/2018 | Leabman et al. | |
| 10,103,582 B2 | 10/2018 | Leabman et al. | |
| 10,110,046 B1 | 10/2018 | Esquibel et al. | |
| 10,122,219 B1 | 11/2018 | Hosseini et al. | |

(56) References Cited

U.S. PATENT DOCUMENTS

| | | |
|---|---|---|
| 10,122,415 B2 | 11/2018 | Bell et al. |
| 10,124,754 B1 | 11/2018 | Leabman |
| 10,128,686 B1 | 11/2018 | Leabman et al. |
| 10,128,695 B2 | 11/2018 | Leabman et al. |
| 10,128,699 B2 | 11/2018 | Leabman |
| 10,134,260 B1 | 11/2018 | Bell et al. |
| 10,135,112 B1 | 11/2018 | Hosseini |
| 10,135,294 B1 | 11/2018 | Leabman |
| 10,135,295 B2 | 11/2018 | Leabman |
| 10,141,768 B2 | 11/2018 | Leabman et al. |
| 10,141,771 B1 | 11/2018 | Hosseini et al. |
| 10,141,791 B2 | 11/2018 | Bell et al. |
| 10,148,097 B1 | 12/2018 | Leabman et al. |
| 10,153,645 B1 | 12/2018 | Bell et al. |
| 10,153,653 B1 | 12/2018 | Bell et al. |
| 10,153,660 B1 | 12/2018 | Leabman et al. |
| 10,158,257 B2 | 12/2018 | Leabman |
| 10,158,259 B1 | 12/2018 | Leabman |
| 10,164,478 B2 | 12/2018 | Leabman |
| 10,170,917 B1 | 1/2019 | Bell et al. |
| 10,177,594 B2 | 1/2019 | Contopanagos |
| 10,181,756 B2 | 1/2019 | Bae et al. |
| 10,186,892 B2 | 1/2019 | Hosseini et al. |
| 10,186,893 B2 | 1/2019 | Bell et al. |
| 10,186,911 B2 | 1/2019 | Leabman |
| 10,186,913 B2 | 1/2019 | Leabman et al. |
| 10,193,396 B1 | 1/2019 | Bell et al. |
| 10,199,835 B2 | 2/2019 | Bell |
| 10,199,849 B1 | 2/2019 | Bell |
| 10,199,850 B2 | 2/2019 | Leabman |
| 10,205,239 B1 | 2/2019 | Contopanagos et al. |
| 10,206,185 B2 | 2/2019 | Leabman et al. |
| 10,211,674 B1 | 2/2019 | Leabman et al. |
| 10,211,680 B2 | 2/2019 | Leabman et al. |
| 10,211,682 B2 | 2/2019 | Bell et al. |
| 10,211,685 B2 | 2/2019 | Bell et al. |
| 10,218,207 B2 | 2/2019 | Hosseini et al. |
| 10,218,227 B2 | 2/2019 | Leabman et al. |
| 10,223,717 B1 | 3/2019 | Bell |
| 10,224,758 B2 | 3/2019 | Leabman et al. |
| 10,224,982 B1 | 3/2019 | Leabman |
| 10,230,266 B1 | 3/2019 | Leabman et al. |
| 10,243,414 B1 | 3/2019 | Leabman et al. |
| 10,256,657 B2 | 4/2019 | Hosseini et al. |
| 10,256,677 B2 | 4/2019 | Hosseini et al. |
| 10,263,432 B1 | 4/2019 | Leabman et al. |
| 10,263,476 B2 | 4/2019 | Leabman |
| 10,270,261 B2 | 4/2019 | Bell et al. |
| 10,277,054 B2 | 4/2019 | Hosseini |
| 10,291,055 B1 | 5/2019 | Bell et al. |
| 10,291,056 B2 | 5/2019 | Bell et al. |
| 10,291,066 B1 | 5/2019 | Leabman |
| 10,291,294 B2 | 5/2019 | Leabman |
| 10,298,024 B2 | 5/2019 | Leabman |
| 10,298,133 B2 | 5/2019 | Leabman |
| 10,305,315 B2 | 5/2019 | Leabman et al. |
| 10,312,715 B2 | 6/2019 | Leabman |
| 10,320,446 B2 | 6/2019 | Hosseini |
| 10,333,332 B1 | 6/2019 | Hosseini |
| 10,355,534 B2 | 7/2019 | Johnston et al. |
| 10,381,880 B2 | 8/2019 | Leabman et al. |
| 10,389,161 B2 | 8/2019 | Hosseini et al. |
| 10,396,588 B2 | 8/2019 | Leabman |
| 10,396,604 B2 | 8/2019 | Bell et al. |
| 10,439,442 B2 | 10/2019 | Hosseini et al. |
| 10,439,448 B2 | 10/2019 | Bell et al. |
| 10,447,093 B2 | 10/2019 | Hosseini |
| 10,476,312 B2 | 11/2019 | Johnston et al. |
| 10,483,768 B2 | 11/2019 | Bell et al. |
| 10,490,346 B2 | 11/2019 | Contopanagos |
| 10,491,029 B2 | 11/2019 | Hosseini |
| 10,498,144 B2 | 12/2019 | Leabman et al. |
| 10,511,097 B2 | 12/2019 | Kornaros et al. |
| 10,511,196 B2 | 12/2019 | Hosseini |
| 10,516,289 B2 | 12/2019 | Leabman et al. |
| 10,516,301 B2 | 12/2019 | Leabman |
| 10,523,033 B2 | 12/2019 | Leabman |
| 10,523,058 B2 | 12/2019 | Leabman |
| 10,554,052 B2 | 2/2020 | Bell et al. |
| 10,594,165 B2 | 3/2020 | Hosseini |
| 10,615,647 B2 | 4/2020 | Johnston et al. |
| 10,680,319 B2 | 6/2020 | Hosseini et al. |
| 10,714,951 B2 * | 7/2020 | Graham ................. H02J 50/60 |
| 10,714,984 B2 | 7/2020 | Hosseini et al. |
| 10,734,717 B2 | 8/2020 | Hosseini |
| 10,778,041 B2 | 9/2020 | Leabman |
| 10,790,674 B2 | 9/2020 | Bell et al. |
| 10,840,743 B2 | 11/2020 | Johnston et al. |
| 10,879,740 B2 | 12/2020 | Hosseini |
| 10,923,954 B2 | 2/2021 | Leabman |
| 10,958,095 B2 | 3/2021 | Leabman et al. |
| 10,985,617 B1 | 4/2021 | Johnston et al. |
| 11,011,942 B2 | 5/2021 | Liu |
| 11,152,820 B2 * | 10/2021 | Weisband ............. H02J 50/402 |
| 2002/0065052 A1 | 5/2002 | Pande et al. |
| 2002/0103447 A1 | 8/2002 | Terry |
| 2002/0171594 A1 | 11/2002 | Fang |
| 2003/0038750 A1 | 2/2003 | Chen |
| 2003/0058187 A1 | 3/2003 | Billiet et al. |
| 2004/0020100 A1 | 2/2004 | O'Brian et al. |
| 2004/0130425 A1 | 7/2004 | Dayan et al. |
| 2004/0130442 A1 | 7/2004 | Breed |
| 2004/0145342 A1 | 7/2004 | Lyon |
| 2004/0155832 A1 | 8/2004 | Yuanzhu |
| 2004/0207559 A1 | 10/2004 | Milosavljevic |
| 2004/0259604 A1 | 12/2004 | Mickle et al. |
| 2005/0007276 A1 | 1/2005 | Barrick et al. |
| 2005/0116683 A1 | 6/2005 | Cheng |
| 2005/0117660 A1 | 6/2005 | Vialle et al. |
| 2005/0134517 A1 | 6/2005 | Gottl |
| 2005/0227619 A1 | 10/2005 | Lee et al. |
| 2005/0237258 A1 | 10/2005 | Abramov et al. |
| 2006/0013335 A1 | 1/2006 | Leabman |
| 2006/0019712 A1 | 1/2006 | Choi |
| 2006/0030279 A1 | 2/2006 | Leabman et al. |
| 2006/0092079 A1 | 5/2006 | de Rochemont |
| 2006/0094425 A1 | 5/2006 | Mickle et al. |
| 2006/0113955 A1 | 6/2006 | Nunally |
| 2006/0119532 A1 | 6/2006 | Yun et al. |
| 2006/0160517 A1 | 7/2006 | Yoon |
| 2006/0199620 A1 | 9/2006 | Greene et al. |
| 2006/0238365 A1 | 10/2006 | Vecchione et al. |
| 2006/0266564 A1 | 11/2006 | Perlman et al. |
| 2006/0266917 A1 | 11/2006 | Baldis et al. |
| 2006/0284593 A1 | 12/2006 | Nagy et al. |
| 2007/0007821 A1 | 1/2007 | Rossetti |
| 2007/0019693 A1 | 1/2007 | Graham |
| 2007/0021140 A1 | 1/2007 | Keyes |
| 2007/0060185 A1 | 3/2007 | Simon et al. |
| 2007/0090997 A1 | 4/2007 | Brown et al. |
| 2007/0093269 A1 | 4/2007 | Leabman et al. |
| 2007/0097653 A1 | 5/2007 | Gilliland et al. |
| 2007/0103110 A1 | 5/2007 | Sagoo |
| 2007/0106894 A1 | 5/2007 | Zhang |
| 2007/0109121 A1 | 5/2007 | Cohen |
| 2007/0139000 A1 | 6/2007 | Kozuma |
| 2007/0149162 A1 | 6/2007 | Greene et al. |
| 2007/0164868 A1 | 7/2007 | Deavours et al. |
| 2007/0173214 A1 | 7/2007 | Mickle et al. |
| 2007/0178857 A1 | 8/2007 | Greene et al. |
| 2007/0178945 A1 | 8/2007 | Cook et al. |
| 2007/0182367 A1 | 8/2007 | Partovi |
| 2007/0191074 A1 | 8/2007 | Harrist et al. |
| 2007/0191075 A1 | 8/2007 | Greene et al. |
| 2007/0210960 A1 | 9/2007 | Rofougaran et al. |
| 2007/0222681 A1 | 9/2007 | Greene et al. |
| 2007/0228833 A1 | 10/2007 | Stevens et al. |
| 2007/0229261 A1 | 10/2007 | Zimmerman et al. |
| 2007/0240297 A1 | 10/2007 | Yang et al. |
| 2007/0273486 A1 | 11/2007 | Shiotsu |
| 2007/0296639 A1 | 12/2007 | Hook et al. |
| 2007/0298846 A1 | 12/2007 | Greene et al. |
| 2008/0014897 A1 | 1/2008 | Cook et al. |
| 2008/0024376 A1 | 1/2008 | Norris et al. |

(56) References Cited

U.S. PATENT DOCUMENTS

| | | |
|---|---|---|
| 2008/0048917 A1 | 2/2008 | Achour et al. |
| 2008/0067874 A1 | 3/2008 | Tseng |
| 2008/0074324 A1 | 3/2008 | Puzella et al. |
| 2008/0089277 A1 | 4/2008 | Alexander et al. |
| 2008/0110263 A1 | 5/2008 | Klessel et al. |
| 2008/0122297 A1 | 5/2008 | Arai |
| 2008/0123383 A1 | 5/2008 | Shionoiri |
| 2008/0169910 A1 | 7/2008 | Greene et al. |
| 2008/0197802 A1 | 8/2008 | Onishi |
| 2008/0204350 A1 | 8/2008 | Tam et al. |
| 2008/0210762 A1 | 9/2008 | Osada et al. |
| 2008/0211458 A1 | 9/2008 | Lawther et al. |
| 2008/0233890 A1 | 9/2008 | Baker |
| 2008/0258993 A1 | 10/2008 | Gummalla et al. |
| 2008/0266191 A1 | 10/2008 | Hilgers |
| 2008/0278378 A1 | 11/2008 | Chang et al. |
| 2008/0309452 A1 | 12/2008 | Zeine |
| 2009/0002493 A1 | 1/2009 | Kates |
| 2009/0010316 A1 | 1/2009 | Rofougaran et al. |
| 2009/0019183 A1 | 1/2009 | Wu et al. |
| 2009/0036065 A1 | 2/2009 | Siu |
| 2009/0039828 A1 | 2/2009 | Jakubowski |
| 2009/0047998 A1 | 2/2009 | Alberth, Jr. |
| 2009/0058361 A1 | 3/2009 | John |
| 2009/0058731 A1 | 3/2009 | Geary et al. |
| 2009/0060012 A1 | 3/2009 | Gresset et al. |
| 2009/0067198 A1 | 3/2009 | Graham et al. |
| 2009/0067208 A1 | 3/2009 | Martin et al. |
| 2009/0073066 A1 | 3/2009 | Jordon et al. |
| 2009/0096412 A1 | 4/2009 | Huang |
| 2009/0096413 A1 | 4/2009 | Partovi |
| 2009/0102292 A1 | 4/2009 | Cook et al. |
| 2009/0102296 A1 | 4/2009 | Greene et al. |
| 2009/0108679 A1 | 4/2009 | Porwal |
| 2009/0122847 A1 | 5/2009 | Nysen et al. |
| 2009/0128262 A1 | 5/2009 | Lee et al. |
| 2009/0174604 A1 | 7/2009 | Keskitalo |
| 2009/0200985 A1 | 8/2009 | Zane et al. |
| 2009/0206791 A1 | 8/2009 | Jung |
| 2009/0207092 A1 | 8/2009 | Nysen et al. |
| 2009/0218884 A1 | 9/2009 | Soar |
| 2009/0218891 A1 | 9/2009 | McCollough |
| 2009/0243397 A1 | 10/2009 | Cook et al. |
| 2009/0256752 A1 | 10/2009 | Akkermans et al. |
| 2009/0264069 A1 | 10/2009 | Yamasuge |
| 2009/0271048 A1 | 10/2009 | Wakamatsu |
| 2009/0281678 A1 | 11/2009 | Wakamatsu |
| 2009/0284082 A1 | 11/2009 | Mohammadian |
| 2009/0284220 A1 | 11/2009 | Toncich et al. |
| 2009/0284227 A1 | 11/2009 | Mohammadian et al. |
| 2009/0286475 A1 | 11/2009 | Toncich et al. |
| 2009/0286476 A1 | 11/2009 | Toncich et al. |
| 2009/0291634 A1 | 11/2009 | Saarisalo |
| 2009/0312046 A1 | 12/2009 | Clevenger et al. |
| 2009/0322281 A1 | 12/2009 | Kamijo et al. |
| 2010/0001683 A1 | 1/2010 | Huang et al. |
| 2010/0007307 A1 | 1/2010 | Baarman et al. |
| 2010/0007569 A1 | 1/2010 | Sim et al. |
| 2010/0019908 A1 | 1/2010 | Cho et al. |
| 2010/0033021 A1 | 2/2010 | Bennett |
| 2010/0034238 A1 | 2/2010 | Bennett |
| 2010/0044123 A1 | 2/2010 | Perlman et al. |
| 2010/0060534 A1 | 3/2010 | Oodachi |
| 2010/0066631 A1 | 3/2010 | Puzella et al. |
| 2010/0075607 A1 | 3/2010 | Hosoya |
| 2010/0079005 A1 | 4/2010 | Hyde et al. |
| 2010/0079011 A1 | 4/2010 | Hyde et al. |
| 2010/0087227 A1 | 4/2010 | Francos et al. |
| 2010/0090656 A1 | 4/2010 | Shearer et al. |
| 2010/0109443 A1 | 5/2010 | Cook et al. |
| 2010/0117926 A1 | 5/2010 | DeJean, II |
| 2010/0123618 A1 | 5/2010 | Martin et al. |
| 2010/0123624 A1 | 5/2010 | Minear et al. |
| 2010/0127660 A1 | 5/2010 | Cook et al. |
| 2010/0142418 A1 | 6/2010 | Nishioka et al. |
| 2010/0142509 A1 | 6/2010 | Zhu et al. |
| 2010/0148723 A1 | 6/2010 | Cook et al. |
| 2010/0151808 A1 | 6/2010 | Toncich et al. |
| 2010/0156741 A1 | 6/2010 | Vazquez et al. |
| 2010/0164296 A1 | 7/2010 | Kurs et al. |
| 2010/0164433 A1 | 7/2010 | Janefalker et al. |
| 2010/0167664 A1 | 7/2010 | Szini |
| 2010/0171461 A1 | 7/2010 | Baarman et al. |
| 2010/0171676 A1 | 7/2010 | Tani et al. |
| 2010/0174629 A1 | 7/2010 | Taylor et al. |
| 2010/0176934 A1 | 7/2010 | Chou et al. |
| 2010/0181961 A1 | 7/2010 | Novak et al. |
| 2010/0181964 A1 | 7/2010 | Huggins et al. |
| 2010/0194206 A1 | 8/2010 | Burdo et al. |
| 2010/0201189 A1 | 8/2010 | Kirby et al. |
| 2010/0201201 A1 | 8/2010 | Mobarhan et al. |
| 2010/0201314 A1 | 8/2010 | Toncich et al. |
| 2010/0207572 A1 | 8/2010 | Kirby et al. |
| 2010/0210233 A1 | 8/2010 | Cook et al. |
| 2010/0213895 A1 | 8/2010 | Keating et al. |
| 2010/0214177 A1 | 8/2010 | Parsche |
| 2010/0222010 A1 | 9/2010 | Ozaki et al. |
| 2010/0225270 A1 | 9/2010 | Jacobs et al. |
| 2010/0227570 A1 | 9/2010 | Hendin |
| 2010/0244576 A1 | 9/2010 | Hillan et al. |
| 2010/0253281 A1 | 10/2010 | Li |
| 2010/0256831 A1 | 10/2010 | Abramo et al. |
| 2010/0259447 A1 | 10/2010 | Crouch |
| 2010/0264747 A1 | 10/2010 | Hall et al. |
| 2010/0277003 A1 | 11/2010 | Von Novak et al. |
| 2010/0279606 A1 | 11/2010 | Hillan et al. |
| 2010/0289341 A1 | 11/2010 | Ozaki et al. |
| 2010/0295372 A1 | 11/2010 | Hyde et al. |
| 2010/0309088 A1 | 12/2010 | Hyvonen et al. |
| 2010/0315045 A1 | 12/2010 | Zeine |
| 2010/0328044 A1 | 12/2010 | Waffenschmidt et al. |
| 2011/0009057 A1 | 1/2011 | Saunamäki |
| 2011/0013198 A1 | 1/2011 | Shirley |
| 2011/0018360 A1 | 1/2011 | Baarman et al. |
| 2011/0028114 A1 | 2/2011 | Kerselaers |
| 2011/0032149 A1 | 2/2011 | Leabman |
| 2011/0032866 A1 | 2/2011 | Leabman |
| 2011/0034190 A1 | 2/2011 | Leabman |
| 2011/0034191 A1 | 2/2011 | Leabman |
| 2011/0043047 A1 | 2/2011 | Karalis et al. |
| 2011/0043163 A1 | 2/2011 | Baarman et al. |
| 2011/0043327 A1 | 2/2011 | Baarman et al. |
| 2011/0050166 A1 | 3/2011 | Cook et al. |
| 2011/0057607 A1 | 3/2011 | Carobolante |
| 2011/0057853 A1 | 3/2011 | Kim et al. |
| 2011/0062788 A1 | 3/2011 | Chen et al. |
| 2011/0074342 A1 | 3/2011 | MacLaughlin |
| 2011/0074349 A1 | 3/2011 | Ghovanloo |
| 2011/0109167 A1 | 5/2011 | Park et al. |
| 2011/0115303 A1 | 5/2011 | Baarman et al. |
| 2011/0115432 A1 | 5/2011 | El-Maleh |
| 2011/0115605 A1 | 5/2011 | Dimig et al. |
| 2011/0121660 A1 | 5/2011 | Azancot et al. |
| 2011/0122018 A1 | 5/2011 | Tarng et al. |
| 2011/0122026 A1 | 5/2011 | DeLaquil et al. |
| 2011/0127845 A1 | 6/2011 | Walley et al. |
| 2011/0127952 A1 | 6/2011 | Walley et al. |
| 2011/0133691 A1 | 6/2011 | Hautanen |
| 2011/0151789 A1 | 6/2011 | Viglione et al. |
| 2011/0154429 A1 | 6/2011 | Stantchev |
| 2011/0156493 A1 | 6/2011 | Bennett |
| 2011/0156494 A1 | 6/2011 | Mashinsky |
| 2011/0156640 A1 | 6/2011 | Moshfeghi |
| 2011/0175455 A1 | 7/2011 | Hashiguchi |
| 2011/0175461 A1 | 7/2011 | Tinaphong |
| 2011/0181120 A1 | 7/2011 | Liu et al. |
| 2011/0182245 A1 | 7/2011 | Malkamaki et al. |
| 2011/0184842 A1 | 7/2011 | Melen |
| 2011/0194543 A1 | 8/2011 | Zhao et al. |
| 2011/0195722 A1 | 8/2011 | Walter et al. |
| 2011/0199046 A1 | 8/2011 | Tsai et al. |
| 2011/0215086 A1 | 9/2011 | Yeh |
| 2011/0217923 A1 | 9/2011 | Ma |
| 2011/0220634 A1 | 9/2011 | Yeh |

(56) References Cited

U.S. PATENT DOCUMENTS

| | | |
|---|---|---|
| 2011/0221389 A1 | 9/2011 | Won et al. |
| 2011/0222272 A1 | 9/2011 | Yeh |
| 2011/0227725 A1 | 9/2011 | Muirhead |
| 2011/0243040 A1 | 10/2011 | Khan et al. |
| 2011/0243050 A1 | 10/2011 | Yanover |
| 2011/0244913 A1 | 10/2011 | Kim et al. |
| 2011/0248573 A1 | 10/2011 | Kanno et al. |
| 2011/0248575 A1 | 10/2011 | Kim et al. |
| 2011/0249678 A1 | 10/2011 | Bonicatto |
| 2011/0254377 A1 | 10/2011 | Widmer et al. |
| 2011/0254503 A1 | 10/2011 | Widmer et al. |
| 2011/0259953 A1 | 10/2011 | Baarman et al. |
| 2011/0273977 A1 | 11/2011 | Shapira et al. |
| 2011/0278941 A1 | 11/2011 | Krishna et al. |
| 2011/0279226 A1 | 11/2011 | Chen et al. |
| 2011/0281535 A1 | 11/2011 | Low et al. |
| 2011/0282415 A1 | 11/2011 | Eckhoff et al. |
| 2011/0285213 A1 | 11/2011 | Kowalewski |
| 2011/0286374 A1 | 11/2011 | Shin et al. |
| 2011/0291489 A1 | 12/2011 | Tsai et al. |
| 2011/0302078 A1 | 12/2011 | Failing |
| 2011/0304216 A1 | 12/2011 | Baarman |
| 2011/0304437 A1 | 12/2011 | Beeler |
| 2011/0304521 A1 | 12/2011 | Ando et al. |
| 2012/0007441 A1 | 1/2012 | John |
| 2012/0013196 A1 | 1/2012 | Kim et al. |
| 2012/0013198 A1 | 1/2012 | Uramoto et al. |
| 2012/0013296 A1 | 1/2012 | Heydari et al. |
| 2012/0019419 A1 | 1/2012 | Prat et al. |
| 2012/0025622 A1 | 2/2012 | Kim et al. |
| 2012/0043887 A1 | 2/2012 | Mesibov |
| 2012/0051109 A1 | 3/2012 | Kim et al. |
| 2012/0051294 A1 | 3/2012 | Guillouard |
| 2012/0056486 A1 | 3/2012 | Endo et al. |
| 2012/0056741 A1 | 3/2012 | Zhu et al. |
| 2012/0068906 A1 | 3/2012 | Asher et al. |
| 2012/0074891 A1 | 3/2012 | Anderson et al. |
| 2012/0075072 A1 | 3/2012 | Pappu |
| 2012/0080944 A1 | 4/2012 | Recker et al. |
| 2012/0080957 A1 | 4/2012 | Cooper et al. |
| 2012/0086284 A1 | 4/2012 | Capanella et al. |
| 2012/0086615 A1 | 4/2012 | Norair |
| 2012/0095617 A1 | 4/2012 | Martin et al. |
| 2012/0098350 A1 | 4/2012 | Campanella et al. |
| 2012/0098485 A1 | 4/2012 | Kang et al. |
| 2012/0099675 A1 | 4/2012 | Kitamura et al. |
| 2012/0103562 A1 | 5/2012 | Clayton |
| 2012/0104849 A1 | 5/2012 | Jackson |
| 2012/0105252 A1 | 5/2012 | Wang |
| 2012/0112532 A1 | 5/2012 | Kesler et al. |
| 2012/0119914 A1 | 5/2012 | Uchida |
| 2012/0126743 A1 | 5/2012 | Rivers, Jr. |
| 2012/0132647 A1 | 5/2012 | Beverly et al. |
| 2012/0133214 A1 | 5/2012 | Yun et al. |
| 2012/0142291 A1 | 6/2012 | Rath et al. |
| 2012/0146426 A1 | 6/2012 | Sabo |
| 2012/0146576 A1 | 6/2012 | Partovi |
| 2012/0146577 A1 | 6/2012 | Tanabe |
| 2012/0147802 A1 | 6/2012 | Ukita et al. |
| 2012/0149307 A1 | 6/2012 | Terada et al. |
| 2012/0150670 A1 | 6/2012 | Taylor et al. |
| 2012/0153894 A1 | 6/2012 | Widmer et al. |
| 2012/0157019 A1 | 6/2012 | Li |
| 2012/0161531 A1 | 6/2012 | Kim et al. |
| 2012/0161544 A1 | 6/2012 | Kashiwagi et al. |
| 2012/0169276 A1 | 7/2012 | Wang |
| 2012/0169278 A1 | 7/2012 | Choi |
| 2012/0173418 A1 | 7/2012 | Beardsmore et al. |
| 2012/0179004 A1 | 7/2012 | Roesicke et al. |
| 2012/0181973 A1 | 7/2012 | Lyden |
| 2012/0182427 A1 | 7/2012 | Marshall |
| 2012/0188142 A1 | 7/2012 | Shashi et al. |
| 2012/0187851 A1 | 8/2012 | Huggins et al. |
| 2012/0193999 A1 | 8/2012 | Zeine |
| 2012/0200399 A1 | 8/2012 | Chae |
| 2012/0201153 A1 | 8/2012 | Bharadia et al. |
| 2012/0201173 A1 | 8/2012 | Jian et al. |
| 2012/0206299 A1 | 8/2012 | Valdes-Garcia |
| 2012/0211214 A1 | 8/2012 | Phan |
| 2012/0212071 A1 | 8/2012 | Miyabayashi et al. |
| 2012/0212072 A1 | 8/2012 | Miyabayashi et al. |
| 2012/0214462 A1 | 8/2012 | Chu et al. |
| 2012/0214536 A1 | 8/2012 | Kim et al. |
| 2012/0228392 A1 | 9/2012 | Cameron et al. |
| 2012/0228956 A1 | 9/2012 | Kamata |
| 2012/0231856 A1 | 9/2012 | Lee et al. |
| 2012/0235636 A1 | 9/2012 | Partovi |
| 2012/0242283 A1 | 9/2012 | Kim et al. |
| 2012/0248886 A1 | 10/2012 | Kesler et al. |
| 2012/0248888 A1 | 10/2012 | Kesler et al. |
| 2012/0248891 A1 | 10/2012 | Drennen |
| 2012/0249051 A1 | 10/2012 | Son et al. |
| 2012/0262002 A1 | 10/2012 | Widmer et al. |
| 2012/0265272 A1 | 10/2012 | Judkins |
| 2012/0267900 A1 | 10/2012 | Huffman et al. |
| 2012/0268238 A1 | 10/2012 | Park et al. |
| 2012/0270592 A1 | 10/2012 | Ngai |
| 2012/0274154 A1 | 11/2012 | DeLuca |
| 2012/0280650 A1 | 11/2012 | Kim et al. |
| 2012/0286582 A1 | 11/2012 | Kim et al. |
| 2012/0292993 A1 | 11/2012 | Mettler et al. |
| 2012/0293021 A1 | 11/2012 | Teggatz et al. |
| 2012/0293119 A1 | 11/2012 | Park et al. |
| 2012/0299389 A1 | 11/2012 | Lee et al. |
| 2012/0299540 A1 | 11/2012 | Perry |
| 2012/0299541 A1 | 11/2012 | Perry |
| 2012/0299542 A1 | 11/2012 | Perry |
| 2012/0300588 A1 | 11/2012 | Perry |
| 2012/0300592 A1 | 11/2012 | Perry |
| 2012/0300593 A1 | 11/2012 | Perry |
| 2012/0306284 A1 | 12/2012 | Lee et al. |
| 2012/0306433 A1 | 12/2012 | Kim et al. |
| 2012/0306572 A1 | 12/2012 | Hietala et al. |
| 2012/0306705 A1 | 12/2012 | Sakurai et al. |
| 2012/0306707 A1 | 12/2012 | Yang et al. |
| 2012/0306720 A1 | 12/2012 | Tanmi et al. |
| 2012/0307873 A1 | 12/2012 | Kim et al. |
| 2012/0309295 A1 | 12/2012 | Maguire |
| 2012/0309308 A1 | 12/2012 | Kim et al. |
| 2012/0309332 A1 | 12/2012 | Liao |
| 2012/0313446 A1 | 12/2012 | Park et al. |
| 2012/0313449 A1 | 12/2012 | Kurs |
| 2012/0313835 A1 | 12/2012 | Gebretnsae |
| 2012/0326660 A1 | 12/2012 | Lu et al. |
| 2013/0002550 A1 | 1/2013 | Zalewski |
| 2013/0005252 A1 | 1/2013 | Lee et al. |
| 2013/0018439 A1 | 1/2013 | Chow et al. |
| 2013/0024059 A1 | 1/2013 | Miller et al. |
| 2013/0026981 A1 | 1/2013 | Van Der Lee |
| 2013/0026982 A1 | 1/2013 | Rothenbaum |
| 2013/0032589 A1 | 2/2013 | Chung |
| 2013/0033571 A1 | 2/2013 | Steen |
| 2013/0038124 A1 | 2/2013 | Newdoll et al. |
| 2013/0038402 A1 | 2/2013 | Karalis et al. |
| 2013/0043738 A1 | 2/2013 | Park et al. |
| 2013/0044035 A1 | 2/2013 | Zhuang |
| 2013/0049471 A1 | 2/2013 | Oleynik |
| 2013/0049475 A1 | 2/2013 | Kim et al. |
| 2013/0049484 A1 | 2/2013 | Weissentem et al. |
| 2013/0057078 A1 | 3/2013 | Lee |
| 2013/0057205 A1 | 3/2013 | Lee et al. |
| 2013/0057210 A1 | 3/2013 | Negaard et al. |
| 2013/0057364 A1 | 3/2013 | Kesler et al. |
| 2013/0058379 A1 | 3/2013 | Kim et al. |
| 2013/0062959 A1 | 3/2013 | Lee et al. |
| 2013/0063082 A1 | 3/2013 | Lee et al. |
| 2013/0063143 A1 | 3/2013 | Adalsteinsson et al. |
| 2013/0063266 A1 | 3/2013 | Yunker et al. |
| 2013/0069444 A1 | 3/2013 | Waffenschmidt et al. |
| 2013/0076308 A1 | 3/2013 | Niskala et al. |
| 2013/0077650 A1 | 3/2013 | Traxler et al. |
| 2013/0078918 A1 | 3/2013 | Crowley et al. |
| 2013/0082651 A1 | 4/2013 | Park et al. |
| 2013/0082653 A1 | 4/2013 | Lee et al. |

(56) References Cited

U.S. PATENT DOCUMENTS

| | | |
|---|---|---|
| 2013/0083774 A1 | 4/2013 | Son et al. |
| 2013/0088082 A1 | 4/2013 | Kang et al. |
| 2013/0088090 A1 | 4/2013 | Wu |
| 2013/0088192 A1 | 4/2013 | Eaton |
| 2013/0088331 A1 | 4/2013 | Cho |
| 2013/0093388 A1 | 4/2013 | Partovi |
| 2013/0099389 A1 | 4/2013 | Hong et al. |
| 2013/0099586 A1 | 4/2013 | Kato |
| 2013/0106197 A1 | 5/2013 | Bae et al. |
| 2013/0107023 A1 | 5/2013 | Tanaka et al. |
| 2013/0119777 A1 | 5/2013 | Rees |
| 2013/0119778 A1 | 5/2013 | Jung |
| 2013/0119929 A1 | 5/2013 | Partovi |
| 2013/0120052 A1 | 5/2013 | Siska |
| 2013/0120205 A1 | 5/2013 | Thomson et al. |
| 2013/0120206 A1 | 5/2013 | Biancotto et al. |
| 2013/0120217 A1 | 5/2013 | Ueda et al. |
| 2013/0130621 A1 | 5/2013 | Kim et al. |
| 2013/0132010 A1 | 5/2013 | Winger et al. |
| 2013/0134923 A1 | 5/2013 | Smith |
| 2013/0137455 A1 | 5/2013 | Xia |
| 2013/0141037 A1 | 6/2013 | Jenwatanavet et al. |
| 2013/0148341 A1 | 6/2013 | Williams |
| 2013/0149975 A1 | 6/2013 | Yu et al. |
| 2013/0154387 A1 | 6/2013 | Lee et al. |
| 2013/0155748 A1 | 6/2013 | Sundstrom |
| 2013/0157729 A1 | 6/2013 | Tabe |
| 2013/0162335 A1 | 6/2013 | Kim et al. |
| 2013/0169061 A1 | 7/2013 | Microshnichenko et al. |
| 2013/0169219 A1 | 7/2013 | Gray |
| 2013/0169348 A1 | 7/2013 | Shi |
| 2013/0171939 A1 | 7/2013 | Tian et al. |
| 2013/0175877 A1 | 7/2013 | Abe et al. |
| 2013/0178253 A1 | 7/2013 | Karaoguz |
| 2013/0181881 A1 | 7/2013 | Christie et al. |
| 2013/0187475 A1 | 7/2013 | Vendik |
| 2013/0190031 A1 | 7/2013 | Persson et al. |
| 2013/0193769 A1 | 8/2013 | Mehta et al. |
| 2013/0197320 A1 | 8/2013 | Albert et al. |
| 2013/0200064 A1 | 8/2013 | Alexander |
| 2013/0207477 A1 | 8/2013 | Nam et al. |
| 2013/0207604 A1 | 8/2013 | Zeine |
| 2013/0207879 A1 | 8/2013 | Rada et al. |
| 2013/0210357 A1 | 8/2013 | Qin et al. |
| 2013/0221757 A1 | 8/2013 | Cho et al. |
| 2013/0222201 A1 | 8/2013 | Ma et al. |
| 2013/0234530 A1 | 9/2013 | Miyauchi |
| 2013/0234536 A1 | 9/2013 | Chemishkian et al. |
| 2013/0234658 A1 | 9/2013 | Endo et al. |
| 2013/0241306 A1 | 9/2013 | Aber et al. |
| 2013/0241468 A1 | 9/2013 | Moshfeghi |
| 2013/0241474 A1 | 9/2013 | Moshfeghi |
| 2013/0249478 A1 | 9/2013 | Hirano |
| 2013/0249479 A1 | 9/2013 | Partovi |
| 2013/0249682 A1 | 9/2013 | Van Wiemeersch et al. |
| 2013/0250102 A1 | 9/2013 | Scanlon et al. |
| 2013/0254578 A1 | 9/2013 | Huang et al. |
| 2013/0264997 A1 | 10/2013 | Lee et al. |
| 2013/0268782 A1 | 10/2013 | Tam et al. |
| 2013/0270923 A1 | 10/2013 | Cook et al. |
| 2013/0278076 A1 | 10/2013 | Proud |
| 2013/0278209 A1 | 10/2013 | Von Novak |
| 2013/0285464 A1 | 10/2013 | Miwa |
| 2013/0285477 A1 | 10/2013 | Lo et al. |
| 2013/0285606 A1 | 10/2013 | Ben-Shalom et al. |
| 2013/0288600 A1 | 10/2013 | Kuusilinna et al. |
| 2013/0288617 A1 | 10/2013 | Kim et al. |
| 2013/0293423 A1 | 11/2013 | Moshfeghi |
| 2013/0300356 A1 | 11/2013 | Yang |
| 2013/0307751 A1 | 11/2013 | Yu-Juin et al. |
| 2013/0310020 A1 | 11/2013 | Kazuhiro |
| 2013/0311798 A1 | 11/2013 | Sultenfuss |
| 2013/0328417 A1 | 12/2013 | Takeuchi |
| 2013/0334883 A1 | 12/2013 | Kim et al. |
| 2013/0339108 A1 | 12/2013 | Ryder et al. |
| 2013/0343208 A1 | 12/2013 | Sexton et al. |
| 2013/0343251 A1 | 12/2013 | Zhang |
| 2013/0343585 A1 | 12/2013 | Bennett et al. |
| 2014/0001846 A1 | 1/2014 | Mosebrook |
| 2014/0001875 A1 | 1/2014 | Nahidipour |
| 2014/0001876 A1 | 1/2014 | Fujiwara et al. |
| 2014/0006017 A1 | 1/2014 | Sen |
| 2014/0008993 A1 | 1/2014 | Leabman |
| 2014/0009110 A1 | 1/2014 | Lee |
| 2014/0011531 A1 | 1/2014 | Burstrom et al. |
| 2014/0015336 A1 | 1/2014 | Weber et al. |
| 2014/0015344 A1 | 1/2014 | Mohamadi |
| 2014/0021907 A1 | 1/2014 | Yu et al. |
| 2014/0021908 A1 | 1/2014 | McCool |
| 2014/0024325 A1 | 1/2014 | Iun et al. |
| 2014/0035524 A1 | 2/2014 | Zeine |
| 2014/0035526 A1 | 2/2014 | Tripathi et al. |
| 2014/0035786 A1 | 2/2014 | Ley |
| 2014/0043248 A1 | 2/2014 | Yeh |
| 2014/0049422 A1 | 2/2014 | Von Novak et al. |
| 2014/0054971 A1 | 2/2014 | Kissin |
| 2014/0055098 A1 | 2/2014 | Lee et al. |
| 2014/0057618 A1 | 2/2014 | Zirwas et al. |
| 2014/0062395 A1 | 3/2014 | Kwon et al. |
| 2014/0082435 A1 | 3/2014 | Kitgawa |
| 2014/0086125 A1 | 3/2014 | Polo et al. |
| 2014/0086592 A1 | 3/2014 | Nakahara et al. |
| 2014/0091756 A1 | 4/2014 | Ofstein et al. |
| 2014/0091968 A1 | 4/2014 | Harel et al. |
| 2014/0091974 A1 | 4/2014 | Desclos et al. |
| 2014/0103869 A1 | 4/2014 | Radovic |
| 2014/0104157 A1 | 4/2014 | Burns |
| 2014/0111147 A1 | 4/2014 | Soar |
| 2014/0111153 A1 | 4/2014 | Kwon et al. |
| 2014/0113689 A1 | 4/2014 | Lee |
| 2014/0117946 A1 | 5/2014 | Muller et al. |
| 2014/0118140 A1 | 5/2014 | Amis |
| 2014/0128107 A1 | 5/2014 | An |
| 2014/0132210 A1 | 5/2014 | Partovi |
| 2014/0133279 A1 | 5/2014 | Khuri-Yakub |
| 2014/0139034 A1 | 5/2014 | Sankar et al. |
| 2014/0139039 A1 | 5/2014 | Cook et al. |
| 2014/0139180 A1 | 5/2014 | Kim et al. |
| 2014/0141838 A1 | 5/2014 | Cai et al. |
| 2014/0142876 A1 | 5/2014 | John et al. |
| 2014/0143933 A1 | 5/2014 | Low et al. |
| 2014/0145879 A1 | 5/2014 | Pan |
| 2014/0145884 A1 | 5/2014 | Dang et al. |
| 2014/0152117 A1 | 6/2014 | Sanker |
| 2014/0159651 A1 | 6/2014 | Von Novak et al. |
| 2014/0159652 A1 | 6/2014 | Hall et al. |
| 2014/0159662 A1 | 6/2014 | Furui |
| 2014/0159667 A1 | 6/2014 | Kim et al. |
| 2014/0169385 A1 | 6/2014 | Hadani et al. |
| 2014/0175893 A1 | 6/2014 | Sengupta et al. |
| 2014/0176054 A1 | 6/2014 | Porat et al. |
| 2014/0176061 A1 | 6/2014 | Cheatham, III et al. |
| 2014/0176082 A1 | 6/2014 | Visser |
| 2014/0177399 A1 | 6/2014 | Teng et al. |
| 2014/0183964 A1 | 7/2014 | Walley |
| 2014/0184148 A1 | 7/2014 | Van Der Lee et al. |
| 2014/0184155 A1 | 7/2014 | Cha |
| 2014/0184163 A1 | 7/2014 | Das et al. |
| 2014/0184170 A1 | 7/2014 | Jeong |
| 2014/0191568 A1 | 7/2014 | Partovi |
| 2014/0191818 A1 | 7/2014 | Waffenschmidt et al. |
| 2014/0194092 A1 | 7/2014 | Wanstedt et al. |
| 2014/0194095 A1 | 7/2014 | Wanstedt et al. |
| 2014/0197691 A1 | 7/2014 | Wang |
| 2014/0203629 A1 | 7/2014 | Hoffman et al. |
| 2014/0206384 A1 | 7/2014 | Kim et al. |
| 2014/0210281 A1 | 7/2014 | Ito et al. |
| 2014/0217955 A1 | 8/2014 | Lin |
| 2014/0217967 A1 | 8/2014 | Zeine et al. |
| 2014/0225805 A1 | 8/2014 | Pan et al. |
| 2014/0232320 A1 | 8/2014 | Ento July et al. |
| 2014/0232610 A1 | 8/2014 | Shigemoto et al. |
| 2014/0239733 A1 | 8/2014 | Mach et al. |
| 2014/0241231 A1 | 8/2014 | Zeine |

(56) References Cited

U.S. PATENT DOCUMENTS

| | | |
|---|---|---|
| 2014/0245036 A1 | 8/2014 | Oishi |
| 2014/0246416 A1 | 9/2014 | White |
| 2014/0247152 A1 | 9/2014 | Proud |
| 2014/0252813 A1 | 9/2014 | Lee et al. |
| 2014/0252866 A1 | 9/2014 | Walsh et al. |
| 2014/0265725 A1 | 9/2014 | Angle et al. |
| 2014/0265727 A1 | 9/2014 | Berte |
| 2014/0265943 A1 | 9/2014 | Angle et al. |
| 2014/0266025 A1 | 9/2014 | Jakubowski |
| 2014/0266946 A1 | 9/2014 | Bily et al. |
| 2014/0273819 A1 | 9/2014 | Nadakuduti et al. |
| 2014/0273892 A1 | 9/2014 | Nourbakhsh |
| 2014/0281655 A1 | 9/2014 | Angle et al. |
| 2014/0292090 A1 | 10/2014 | Cordeiro et al. |
| 2014/0292451 A1 | 10/2014 | Zimmerman |
| 2014/0300452 A1 | 10/2014 | Rofe et al. |
| 2014/0312706 A1 | 10/2014 | Fiorello et al. |
| 2014/0325218 A1 | 10/2014 | Shimizu et al. |
| 2014/0327320 A1 | 11/2014 | Muhs et al. |
| 2014/0327390 A1 | 11/2014 | Park et al. |
| 2014/0333142 A1 | 11/2014 | Desrosiers |
| 2014/0346860 A1 | 11/2014 | Aubry et al. |
| 2014/0354063 A1 | 12/2014 | Leabman et al. |
| 2014/0354221 A1 | 12/2014 | Leabman et al. |
| 2014/0355718 A1 | 12/2014 | Guan et al. |
| 2014/0368048 A1 | 12/2014 | Leabman et al. |
| 2014/0368161 A1 | 12/2014 | Leabman et al. |
| 2014/0368405 A1 | 12/2014 | Ek et al. |
| 2014/0375139 A1 | 12/2014 | Tsukamoto |
| 2014/0375253 A1 | 12/2014 | Leabman et al. |
| 2014/0375258 A1 | 12/2014 | Arkhipenkov |
| 2014/0375261 A1 | 12/2014 | Manova-Elssibony et al. |
| 2015/0001949 A1 | 1/2015 | Leabman et al. |
| 2015/0002086 A1 | 1/2015 | Matos et al. |
| 2015/0003207 A1 | 1/2015 | Lee et al. |
| 2015/0008980 A1 | 1/2015 | Kim et al. |
| 2015/0011160 A1 | 1/2015 | Uurgovan et al. |
| 2015/0015180 A1 | 1/2015 | Miller et al. |
| 2015/0015182 A1 | 1/2015 | Brandtman et al. |
| 2015/0015192 A1 | 1/2015 | Leabman et al. |
| 2015/0021990 A1 | 1/2015 | Myer et al. |
| 2015/0022008 A1 | 1/2015 | Leabman et al. |
| 2015/0022010 A1 | 1/2015 | Leabman et al. |
| 2015/0022194 A1 | 1/2015 | Almalki et al. |
| 2015/0023204 A1 | 1/2015 | Wil et al. |
| 2015/0028688 A1 | 1/2015 | Masaoka |
| 2015/0028694 A1 | 1/2015 | Leabman et al. |
| 2015/0028697 A1 | 1/2015 | Leabman et al. |
| 2015/0028875 A1 | 1/2015 | Irie et al. |
| 2015/0035378 A1 | 2/2015 | Calhoun et al. |
| 2015/0035709 A1 | 2/2015 | Lim |
| 2015/0035715 A1 | 2/2015 | Kim et al. |
| 2015/0039482 A1 | 2/2015 | Fuinaga |
| 2015/0041459 A1 | 2/2015 | Leabman et al. |
| 2015/0042265 A1 | 2/2015 | Leabman et al. |
| 2015/0044977 A1 | 2/2015 | Ramasamy et al. |
| 2015/0046526 A1 | 2/2015 | Bush et al. |
| 2015/0061404 A1 | 3/2015 | Lamenza et al. |
| 2015/0076917 A1 | 3/2015 | Leabman et al. |
| 2015/0076927 A1 | 3/2015 | Leabman et al. |
| 2015/0077036 A1 | 3/2015 | Leabman et al. |
| 2015/0077037 A1 | 3/2015 | Leabman et al. |
| 2015/0091520 A1 | 4/2015 | Blum et al. |
| 2015/0091706 A1 | 4/2015 | Chemishkian et al. |
| 2015/0097442 A1 | 4/2015 | Muurinen |
| 2015/0097663 A1 | 4/2015 | Sloo et al. |
| 2015/0102764 A1 | 4/2015 | Leabman et al. |
| 2015/0102769 A1 | 4/2015 | Leabman et al. |
| 2015/0102942 A1 | 4/2015 | Houser et al. |
| 2015/0102973 A1 | 4/2015 | Hand et al. |
| 2015/0108848 A1 | 4/2015 | Joehren |
| 2015/0109181 A1 | 4/2015 | Hyde et al. |
| 2015/0115877 A1 | 4/2015 | Aria et al. |
| 2015/0115878 A1 | 4/2015 | Park |
| 2015/0116153 A1 | 4/2015 | Chen et al. |
| 2015/0128733 A1 | 5/2015 | Taylor et al. |
| 2015/0130285 A1 | 5/2015 | Leabman et al. |
| 2015/0130293 A1 | 5/2015 | Hajimiri et al. |
| 2015/0137612 A1 | 5/2015 | Yamakawa et al. |
| 2015/0148664 A1 | 5/2015 | Stolka et al. |
| 2015/0155737 A1 | 6/2015 | Mayo |
| 2015/0155738 A1 | 6/2015 | Leabman et al. |
| 2015/0162662 A1 | 6/2015 | Chen et al. |
| 2015/0162751 A1 | 6/2015 | Leabman et al. |
| 2015/0162779 A1 | 6/2015 | Lee et al. |
| 2015/0171512 A1 | 6/2015 | Chen et al. |
| 2015/0171513 A1 | 6/2015 | Chen et al. |
| 2015/0171656 A1 | 6/2015 | Leabman et al. |
| 2015/0171658 A1 | 6/2015 | Manova-Elssibony et al. |
| 2015/0171931 A1 | 6/2015 | Won et al. |
| 2015/0177326 A1 | 6/2015 | Chakraborty et al. |
| 2015/0180133 A1 | 6/2015 | Hunt |
| 2015/0180249 A1 | 6/2015 | Jeon et al. |
| 2015/0180284 A1 | 6/2015 | Kang et al. |
| 2015/0181117 A1 | 6/2015 | Park et al. |
| 2015/0187491 A1 | 7/2015 | Yanagawa |
| 2015/0188352 A1 | 7/2015 | Peek et al. |
| 2015/0199665 A1 | 7/2015 | Chu |
| 2015/0201385 A1 | 7/2015 | Mercer et al. |
| 2015/0207333 A1 | 7/2015 | Baarman et al. |
| 2015/0207542 A1 | 7/2015 | Zeine |
| 2015/0222126 A1 | 8/2015 | Leabman et al. |
| 2015/0233987 A1 | 8/2015 | Von Novak, III et al. |
| 2015/0234144 A1 | 8/2015 | Cameron et al. |
| 2015/0236520 A1 | 8/2015 | Baarman |
| 2015/0236877 A1 | 8/2015 | Peng et al. |
| 2015/0244070 A1 | 8/2015 | Cheng et al. |
| 2015/0244080 A1 | 8/2015 | Gregoire |
| 2015/0244187 A1 | 8/2015 | Horie |
| 2015/0244201 A1 | 8/2015 | Chu |
| 2015/0244341 A1 | 8/2015 | Ritter et al. |
| 2015/0249484 A1 | 9/2015 | Mach et al. |
| 2015/0255989 A1 | 9/2015 | Walley et al. |
| 2015/0256097 A1 | 9/2015 | Gudan et al. |
| 2015/0260835 A1 | 9/2015 | Widmer et al. |
| 2015/0262465 A1 | 9/2015 | Pritchett |
| 2015/0263534 A1 | 9/2015 | Lee et al. |
| 2015/0263548 A1 | 9/2015 | Cooper |
| 2015/0270618 A1 | 9/2015 | Zhu et al. |
| 2015/0270622 A1 | 9/2015 | Takasaki et al. |
| 2015/0270741 A1 | 9/2015 | Leabman et al. |
| 2015/0278558 A1 | 10/2015 | Priev et al. |
| 2015/0280429 A1 | 10/2015 | Makita et al. |
| 2015/0280484 A1 | 10/2015 | Radziemski et al. |
| 2015/0288074 A1 | 10/2015 | Harper et al. |
| 2015/0288438 A1 | 10/2015 | Maltsev et al. |
| 2015/0311585 A1 | 10/2015 | Church et al. |
| 2015/0312721 A1 | 10/2015 | Singh |
| 2015/0318729 A1 | 11/2015 | Leabman |
| 2015/0326024 A1 | 11/2015 | Bell et al. |
| 2015/0326070 A1 | 11/2015 | Petras et al. |
| 2015/0326072 A1 | 11/2015 | Petras et al. |
| 2015/0326143 A1 | 11/2015 | Petras et al. |
| 2015/0327085 A1 | 11/2015 | Hadani |
| 2015/0333528 A1 | 11/2015 | Leabman |
| 2015/0333573 A1 | 11/2015 | Leabman |
| 2015/0333800 A1 | 11/2015 | Perry et al. |
| 2015/0339497 A1 | 11/2015 | Kurian |
| 2015/0340759 A1 | 11/2015 | Bridgelall et al. |
| 2015/0340903 A1 | 11/2015 | Bell et al. |
| 2015/0341087 A1 | 11/2015 | Moore et al. |
| 2015/0358222 A1 | 12/2015 | Berger et al. |
| 2015/0365137 A1 | 12/2015 | Miller et al. |
| 2015/0365138 A1 | 12/2015 | Miller et al. |
| 2016/0005068 A1 | 1/2016 | Im et al. |
| 2016/0012695 A1 | 1/2016 | Bell et al. |
| 2016/0013560 A1 | 1/2016 | Daniels |
| 2016/0013661 A1 | 1/2016 | Kurs et al. |
| 2016/0013677 A1 | 1/2016 | Bell et al. |
| 2016/0013855 A1 | 1/2016 | Campos |
| 2016/0020636 A1 | 1/2016 | Khlat |
| 2016/0028403 A1 | 1/2016 | McCaughan et al. |
| 2016/0033254 A1 | 2/2016 | Zeine et al. |
| 2016/0042206 A1 | 2/2016 | Pesavento et al. |

(56) References Cited

U.S. PATENT DOCUMENTS

| | | |
|---|---|---|
| 2016/0043571 A1 | 2/2016 | Kesler et al. |
| 2016/0043572 A1 | 2/2016 | Cooper et al. |
| 2016/0054440 A1 | 2/2016 | Younis |
| 2016/0056635 A1 | 2/2016 | Bell |
| 2016/0056640 A1 | 2/2016 | Mao |
| 2016/0065005 A1 | 3/2016 | Won et al. |
| 2016/0079799 A1 | 3/2016 | Khlat |
| 2016/0087483 A1 | 3/2016 | Hietala et al. |
| 2016/0087486 A1 | 3/2016 | Pogorelik et al. |
| 2016/0094091 A1 | 3/2016 | Shin et al. |
| 2016/0094092 A1 | 3/2016 | Davlantes et al. |
| 2016/0099601 A1 | 4/2016 | Leabman et al. |
| 2016/0099611 A1 | 4/2016 | Leabman et al. |
| 2016/0099612 A1 | 4/2016 | Leabman et al. |
| 2016/0099614 A1 | 4/2016 | Leabman et al. |
| 2016/0099755 A1 | 4/2016 | Leabman et al. |
| 2016/0099757 A1 | 4/2016 | Leabman et al. |
| 2016/0112787 A1 | 4/2016 | Rich |
| 2016/0126749 A1 | 5/2016 | Shichino et al. |
| 2016/0126752 A1 | 5/2016 | Vuori et al. |
| 2016/0126776 A1 | 5/2016 | Kim et al. |
| 2016/0141908 A1 | 5/2016 | Jakl et al. |
| 2016/0164563 A1 | 6/2016 | Khawand et al. |
| 2016/0174162 A1 | 6/2016 | Nadakuduti et al. |
| 2016/0181849 A1 | 6/2016 | Govindaraj |
| 2016/0181867 A1 | 6/2016 | Daniel et al. |
| 2016/0181873 A1 | 6/2016 | Mitcheson et al. |
| 2016/0197522 A1 | 7/2016 | Zeine et al. |
| 2016/0202343 A1 | 7/2016 | Okutsu |
| 2016/0204642 A1 | 7/2016 | Oh |
| 2016/0204643 A1 | 7/2016 | Manova-Elssibony |
| 2016/0218545 A1 | 7/2016 | Schroeder et al. |
| 2016/0233582 A1 | 8/2016 | Piskun |
| 2016/0238365 A1 | 8/2016 | Wixey et al. |
| 2016/0240908 A1 | 8/2016 | Strong |
| 2016/0248276 A1 | 8/2016 | Hong et al. |
| 2016/0294225 A1 | 10/2016 | Blum et al. |
| 2016/0299210 A1 | 10/2016 | Zeine |
| 2016/0301240 A1 | 10/2016 | Zeine |
| 2016/0322868 A1 | 11/2016 | Akuzawa et al. |
| 2016/0323000 A1 | 11/2016 | Liu et al. |
| 2016/0336804 A1 | 11/2016 | Son et al. |
| 2016/0339258 A1 | 11/2016 | Perryman et al. |
| 2016/0344098 A1 | 11/2016 | Ming |
| 2016/0359367 A1 | 12/2016 | Rothschild |
| 2016/0380464 A1 | 12/2016 | Chin et al. |
| 2016/0380466 A1 | 12/2016 | Yang et al. |
| 2017/0005481 A1 | 1/2017 | Von Novak, III |
| 2017/0005516 A9 | 1/2017 | Leabman et al. |
| 2017/0005524 A1 | 1/2017 | Akuzawa et al. |
| 2017/0005530 A1 | 1/2017 | Zeine et al. |
| 2017/0012448 A1 | 1/2017 | Miller et al. |
| 2017/0025887 A1 | 1/2017 | Hyun et al. |
| 2017/0025903 A1 | 1/2017 | Song et al. |
| 2017/0026087 A1 | 1/2017 | Tanabe |
| 2017/0040700 A1 | 2/2017 | Leung |
| 2017/0043675 A1 | 2/2017 | Jones et al. |
| 2017/0047784 A1 | 2/2017 | Jung et al. |
| 2017/0063168 A1 | 3/2017 | Uchida |
| 2017/0077733 A1 | 3/2017 | Jeong et al. |
| 2017/0077765 A1 | 3/2017 | Bell et al. |
| 2017/0077979 A1 | 3/2017 | Papa et al. |
| 2017/0077995 A1 | 3/2017 | Leabman |
| 2017/0085120 A1 | 3/2017 | Leabman et al. |
| 2017/0085437 A1 | 3/2017 | Condeixa et al. |
| 2017/0092115 A1 | 3/2017 | Sloo et al. |
| 2017/0110886 A1 | 4/2017 | Reynolds et al. |
| 2017/0110910 A1 | 4/2017 | Zeine et al. |
| 2017/0127196 A1 | 5/2017 | Blum et al. |
| 2017/0134686 A9 | 5/2017 | Leabman |
| 2017/0141582 A1 | 5/2017 | Adolf et al. |
| 2017/0141583 A1 | 5/2017 | Adolf et al. |
| 2017/0163076 A1 | 6/2017 | Park et al. |
| 2017/0168595 A1 | 6/2017 | Sakaguchi et al. |
| 2017/0179763 A9 | 6/2017 | Leabman |
| 2017/0214422 A1 | 7/2017 | Na et al. |
| 2017/0274787 A1 | 9/2017 | Salter et al. |
| 2017/0338695 A1 | 11/2017 | Port |
| 2018/0006611 A1 | 1/2018 | de Jong et al. |
| 2018/0040929 A1 | 2/2018 | Chappelle |
| 2018/0048178 A1 | 2/2018 | Leabman |
| 2018/0090992 A1 | 3/2018 | Shrivastava et al. |
| 2018/0226840 A1 | 8/2018 | Leabman |
| 2018/0227018 A1 | 8/2018 | Moshfeghi |
| 2018/0241255 A1 | 8/2018 | Leabman |
| 2018/0262050 A1 | 9/2018 | Yankowitz |
| 2018/0262060 A1 | 9/2018 | Johnston |
| 2018/0301934 A1 | 10/2018 | Prabhala et al. |
| 2018/0309314 A1 | 10/2018 | White et al. |
| 2018/0331581 A1 | 11/2018 | Hosseini |
| 2018/0343040 A1 | 11/2018 | Luzinski et al. |
| 2018/0375368 A1 | 12/2018 | Leabman et al. |
| 2018/0376235 A1 | 12/2018 | Leabman |
| 2019/0052979 A1 | 2/2019 | Chen et al. |
| 2019/0074728 A1 | 3/2019 | Leabman |
| 2019/0074862 A1 | 3/2019 | Wang et al. |
| 2019/0131827 A1 | 5/2019 | Johnston |
| 2019/0288567 A1 | 9/2019 | Leabman et al. |
| 2019/0296586 A1 | 9/2019 | Moshfeghi |
| 2019/0326782 A1 | 10/2019 | Graham et al. |
| 2019/0372384 A1 | 12/2019 | Hosseini et al. |
| 2019/0386522 A1 | 12/2019 | Park et al. |
| 2019/0393729 A1 | 12/2019 | Contopanagos et al. |
| 2019/0393928 A1 | 12/2019 | Leabman |
| 2020/0006988 A1 | 1/2020 | Leabman |
| 2020/0021128 A1 | 1/2020 | Bell et al. |
| 2020/0091608 A1 | 3/2020 | Alpman et al. |
| 2020/0112204 A1 | 4/2020 | Hosseini et al. |
| 2020/0119582 A1* | 4/2020 | Salzinger .............. H02J 7/0042 |
| 2020/0153117 A1 | 5/2020 | Papio-Toda et al. |
| 2020/0203837 A1 | 6/2020 | Kornaros et al. |
| 2020/0212721 A1* | 7/2020 | Narayana Bhat ..... B60L 53/122 |
| 2020/0235614 A1 | 7/2020 | Swan et al. |
| 2020/0244104 A1 | 7/2020 | Katajamaki et al. |
| 2020/0244111 A1 | 7/2020 | Johnston et al. |
| 2020/0252141 A1 | 8/2020 | Sarajedini |
| 2020/0274397 A1 | 8/2020 | Hwang et al. |

FOREIGN PATENT DOCUMENTS

| | | |
|---|---|---|
| CN | 102292896 A | 12/2011 |
| CN | 102860037 A | 1/2013 |
| CN | 103151848 A | 6/2013 |
| CN | 103348563 A | 10/2013 |
| CN | 203826555 U | 9/2014 |
| CN | 104090265 A | 10/2014 |
| CN | 104167773 A | 11/2014 |
| CN | 104347915 A | 2/2015 |
| CN | 105765821 A | 7/2016 |
| CN | 106329116 A | 1/2017 |
| CN | 103380561 B | 9/2017 |
| DE | 20016655 U1 | 2/2002 |
| DE | 102013216953 A1 | 2/2015 |
| EP | 1028482 A2 | 8/2000 |
| EP | 1081506 A1 | 3/2001 |
| EP | 2346136 A1 | 7/2011 |
| EP | 2397973 A1 | 2/2012 |
| EP | 2545635 A2 | 1/2013 |
| EP | 2747195 A1 | 6/2014 |
| EP | 3067983 A1 | 9/2016 |
| EP | 3118970 A1 | 1/2017 |
| EP | 3145052 A1 | 3/2017 |
| GB | 2404497 A | 2/2005 |
| GB | 2556620 A | 6/2018 |
| JP | 2000323916 A | 11/2000 |
| JP | 2002319816 A | 10/2002 |
| JP | 2006157586 A | 6/2006 |
| JP | 2007043432 A | 2/2007 |
| JP | 2008167017 A | 7/2008 |
| JP | 2009525715 A | 7/2009 |
| JP | 2009201328 A | 9/2009 |
| JP | 2012016171 A | 1/2012 |
| JP | 2012095226 A | 5/2012 |
| JP | 2012157167 A | 8/2012 |

(56) References Cited

FOREIGN PATENT DOCUMENTS

| | | | |
|---|---|---|---|
| JP | 2013099249 A | 5/2013 |
| JP | 2013162624 A | 8/2013 |
| JP | 2014075927 A | 4/2014 |
| JP | 2014112063 A | 6/2014 |
| JP | 2014176131 A | 9/2014 |
| JP | 2015027345 A | 2/2015 |
| JP | 2015128349 A | 7/2015 |
| JP | 2015128370 A | 7/2015 |
| JP | WO2015177859 A1 | 4/2017 |
| KR | 20060061776 A | 6/2006 |
| KR | 20070044302 A | 4/2007 |
| KR | 100755144 B1 | 9/2007 |
| KR | 100819604 B1 | 4/2008 |
| KR | 20110132059 A | 12/2011 |
| KR | 20110135540 A1 | 12/2011 |
| KR | 20120009843 A | 2/2012 |
| KR | 20120108759 A | 10/2012 |
| KR | 20130026977 A | 3/2013 |
| KR | 20140023409 A | 2/2014 |
| KR | 20140023410 A | 3/2014 |
| KR | 20140085200 A | 7/2014 |
| KR | 20140148270 A | 12/2014 |
| KR | 20150077678 A | 7/2015 |
| KR | 20180114721 A | 10/2018 |
| RU | 2658332 C1 | 6/2018 |
| WO | WO 199508125 A1 | 3/1995 |
| WO | WO 199831070 A1 | 7/1998 |
| WO | WO 199952173 A1 | 10/1999 |
| WO | WO 2000111716 A1 | 2/2001 |
| WO | WO 2003091943 A1 | 11/2003 |
| WO | WO 2004077550 A1 | 9/2004 |
| WO | WO 2006122783 A2 | 11/2006 |
| WO | WO 2007070571 A2 | 6/2007 |
| WO | WO 2008024993 A2 | 2/2008 |
| WO | WO 2008156571 A2 | 12/2008 |
| WO | WO 2010022181 A1 | 2/2010 |
| WO | WO 2010039246 A1 | 4/2010 |
| WO | WO 2010138994 A1 | 12/2010 |
| WO | WO 2011112022 A2 | 9/2011 |
| WO | WO 2012177283 A1 | 12/2012 |
| WO | WO 2013031988 A1 | 3/2013 |
| WO | WO 2013035190 A1 | 3/2013 |
| WO | WO 2013038074 A2 | 3/2013 |
| WO | WO 2013042399 A1 | 3/2013 |
| WO | WO 2013052950 A1 | 4/2013 |
| WO | WO 2013105920 A2 | 7/2013 |
| WO | WO 2013175596 A1 | 11/2013 |
| WO | WO 2014068992 A1 | 5/2014 |
| WO | WO 2014075103 A1 | 5/2014 |
| WO | WO 2014113093 A1 | 7/2014 |
| WO | WO 2014132258 A1 | 9/2014 |
| WO | WO 2014134996 A1 | 9/2014 |
| WO | WO 2014182788 A2 | 11/2014 |
| WO | WO 2014182788 A3 | 11/2014 |
| WO | WO 2014197472 A1 | 12/2014 |
| WO | WO 2014209587 A1 | 12/2014 |
| WO | WO 2015038773 A1 | 3/2015 |
| WO | WO 2015097809 A1 | 7/2015 |
| WO | WO 2015130902 A1 | 9/2015 |
| WO | WO 2015161323 A1 | 10/2015 |
| WO | WO 2016024869 A1 | 2/2016 |
| WO | WO 2016048512 A1 | 3/2016 |
| WO | WO 2016088261 A1 | 6/2016 |
| WO | WO 2016187357 A1 | 11/2016 |

OTHER PUBLICATIONS

Energous Corp., IPRP, PCT/US2014/040705, Dec. 8, 2015, 6 pgs.
Energous Corp., IPRP, PCT/US2014/045119, Jan. 12, 2016, 9 pgs.
Energous Corp., IPRP, PCT/US2014/048002, Feb. 12, 2015 8 pgs.
Energous Corp., IPRP, PCT/US2014/049669, Feb. 9, 2016, 8 pgs.
Energous Corp., IPRP, PCT/US2014/059317, Apr. 12, 2016, 10 pgs.
Energous Corp., IPRP, PCT/US2014/059340, Apr. 12, 2016, 11 pgs.
Energous Corp., IPRP, PCT/US2014/059871, Apr. 12, 2016, 9 pgs.
Energous Corp., IPRP, PCT/US2014/062661, May 3, 2016, 10 pgs.
Energous Corp., IPRP, PCT/US2014/068282, Jun. 7, 2016, 10 pgs.
Energous Corp., IPRP, PCT/US2014/068586, Jun. 14, 2016, 8 pgs.
Energous Corp., IPRP, PCT/US2015/067242, Jun. 27, 2017, 7 pgs.
Energous Corp., IPRP, PCT/US2015/067243, Jun. 27, 2017, 7 pgs.
Energous Corp., IPRP, PCT/US2015/067245, Jun. 27, 2017, 7 pgs.
Energous Corp., IPRP, PCT/US2015/067246, Jun. 27, 2017, 9 pgs.
Energous Corp., IPRP, PCT/US2015/067249, Jun. 27, 2017, 7 pgs.
Energous Corp., IPRP, PCT/US2015/067250, Mar. 30, 2016, 10 pgs.
Energous Corp., IPRP, PCT/US2015/067271, Jul. 4, 2017, 5 pgs.
Energous Corp., IPRP, PCT/US2015/067275, Jul. 4, 2017, 7 pgs.
Energous Corp., IPRP, PCT/US2015/067279, Jul. 4, 2017, 7 pgs.
Energous Corp., IPRP, PCT/US2015/067282, Jul. 4, 2017, 6 pgs.
Energous Corp., IPRP, PCT/US2015/067287, Jul. 4, 2017, 6 pgs.
Energous Corp., IPRP, PCT/US2015/067291, Jul. 4, 2017, 4 pgs.
Energous Corp., IPRP, PCT/US2015/067294, Jul. 4, 2017, 6 pgs.
Energous Corp., IPRP, PCT/US2015/067325, Jul. 4, 2017, 8 pgs.
Energous Corp., IPRP, PCT/US2015/067334, Jul. 4, 2017, 5 pgs.
Energous Corp., IPRP, PCT/US2016/068495, Jun. 26, 2018, 7 pgs.
Energous Corp., IPRP, PCT/US2016/068551, Jun. 26, 2018, 6 pgs.
Energous Corp., IPRP, PCT/US2016/068987, Jul. 3, 2018, 7 pgs.
Energous Corp., IPRP, PCT/US2016/068993, Jul. 3, 2018, 10 pgs.
Energous Corp., IPRP, PCT/US2017/046800, Feb. 12, 2019, 10 pgs.
Energous Corp., IPRP, PCT/US2017/065886, Jun. 18, 2019, 10 pgs.
Energous Corp., IPRP, PCT/US2018/012806, Jul. 9, 2019, 6 pgs.
Energous Corp., IPRP, PCT/US2018/025465, Oct. 1, 2019, 8 pgs.
Energous Corp., IPRP, PCT/US2018/031768, Nov. 12, 2019, 8 pgs.
Energous Corp., IPRP, PCT/US2018/031786, Apr. 14, 2020, 7 pgs.
Energous Corp., IPRP, PCT/US2018/039334, Dec. 24, 2019, 8 pgs.
Energous Corp., IPRP, PCT/US2018/051082, Mar. 17, 2020, 9 pgs.
Energous Corp., IPRP, PCT/US2018/058178, May 5, 2020, 7 pgs.
Energous Corp., IPRP, PCT/US2019/015820, Aug. 4, 2020, 7 pgs.
Energous Corp., IPRP, PCT/US2019/021817, Sep. 15, 2020, 7 pgs.
Energous Corp., ISRWO, PCT/US2014/037072, Sep. 12, 2014, 8 pgs.
Energous Corp., ISRWO, PCT/US2014/037109, Apr. 8, 2016, 12 pgs.
Energous Corp., ISRWO, PCT/US2014/037170, Sep. 15, 2014, 11 pgs.
Energous Corp., ISRWO, PCT/US2014/040648, Oct. 10, 2014, 11 pgs.
Energous Corp., ISRWO, PCT/US2014/040697, Oct. 1, 2014, 12 pgs.
Energous Corp., ISRWO, PCT/US2014/040705, Sep. 23, 2014, 8 pgs.
Energous Corp., ISRWO, PCT/US2014/041323, Oct. 1, 2014, 10 pgs.
Energous Corp., ISRWO, PCT/US2014/041342, Jan. 27, 2015, 10 pgs.
Energous Corp., ISRWO, PCT/US2014/041534, Oct. 13, 2014, 10 pgs.
Energous Corp., ISRWO, PCT/US2014/041546, Oct. 16, 2014, 12 pgs.
Energous Corp., ISRWO, PCT/US2014/041558, Oct. 10, 2014, 8 pgs.
Energous Corp., ISRWO, PCT/US2014/044810 Oct. 21, 2014, 12 pgs.
Energous Corp., ISRWO, PCT/US2014/045102, Oct. 28, 2014, 14 pgs.
Energous Corp., ISRWO, PCT/US2014/045119, Oct. 13, 2014, 11 pgs.
Energous Corp., ISRWO, PCT/US2014/045237, Oct. 13, 2014, 16 pgs.
Energous Corp., ISRWO, PCT/US2014/046941, Nov. 6, 2014, 11 pgs.
Energous Corp., ISRWO, PCT/US2014/046956, Nov. 12, 2014, 10 pgs.
Energous Corp., ISRWO, PCT/US2014/046961, Nov. 24, 2014, 16 pgs.
Energous Corp., ISRWO, PCT/US2014/047963, Nov. 7, 2014, 13 pgs.

(56) References Cited

OTHER PUBLICATIONS

Energous Corp., ISRWO, PCT/US2014/048002, Nov. 13, 2014, 11 pgs.
Energous Corp., ISRWO, PCT/US2014/049666, Nov. 10, 2014, 7 pgs.
Energous Corp., ISRWO, PCT/US2014/049669, Nov. 13, 2014, 10 pgs.
Energous Corp., ISRWO, PCT/US2014/049673, Nov. 18, 2014, 10 pgs.
Energous Corp., ISRWO, PCT/US2014/054891, Dec. 18, 2014, 12 pgs.
Energous Corp., ISRWO, PCT/US2014/054897, Feb. 17, 2015, 10 pgs.
Energous Corp., ISRWO, PCT/US2014/054953, Dec. 4, 2014, 7 pgs.
Energous Corp., ISRWO, PCT/US2014/055195, Dec. 22, 2014, 11 pgs.
Energous Corp., ISRWO, PCT/US2014/059317, Feb. 24, 2015, 13 pgs.
Energous Corp., ISRWO, PCT/US2014/059340, Jan. 15, 2015, 13 pgs.
Energous Corp., ISRWO, PCT/US2014/059871, Jan. 23, 2015, 12 pgs.
Energous Corp., ISRWO, PCT/US2014/062661, Jan. 27, 2015, 12 pgs.
Energous Corp., ISRWO, PCT/US2014/062672, Jan. 26, 2015, 11 pgs.
Energous Corp., ISRWO, PCT/US2014/062682, Feb. 12, 2015, 10 pgs.
Energous Corp., ISRWO, PCT/US2014/068282, Mar. 19, 2015, 13 pgs.
Energous Corp., ISRWO, PCT/US2014/068568, Mar. 20, 2015, 10 pgs.
Energous Corp., ISRWO, PCT/US2014/068586, Mar. 20, 2015, 11 pgs.
Energous Corp., ISRWO, PCT/US2015/067242, Mar. 16, 2016, 9 pgs.
Energous Corp., ISRWO, PCT/US2015/067243, Mar. 10, 2016, 11 pgs.
Energous Corp., ISRWO, PCT/US2015/067245, Mar. 17, 2016, 8 pgs.
Energous Corp., ISRWO, PCT/US2015/067246, May 11, 2016, 18 pgs.
Energous Corp., ISRWO, PCT/US2015/067249, Mar. 29, 2016, 8 pgs.
Energous Corp., ISRWO, PCT/US2015/067250, Mar. 30, 2016, 11 pgs.
Energous Corp., ISRWO, PCT/US2015/067271, Mar. 11, 2016, 6 pgs.
Energous Corp., ISRWO, PCT/US2015/067275, Mar. 3, 2016, 8 pgs.
Energous Corp., ISRWO, PCT/US2015/067279, Mar. 11, 2015, 13 pgs.
Energous Corp., ISRWO, PCT/US2015/067282, Jul. 5, 2016, 7 pgs.
Energous Corp., ISRWO, PCT/US2015/067287, Feb. 2, 2016, 8 pgs.
Energous Corp., ISRWO, PCT/US2015/067291, Mar. 4, 2016, 10 pgs.
Energous Corp., ISRWO, PCT/US2015/067294, Mar. 29, 2016, 7 pgs.
Energous Corp., ISRWO, PCT/US2015/067325, Mar. 10, 2016, 9 pgs.
Energous Corp., ISRWO, PCT/US2015/067334, Mar. 3, 2016, 6 pgs.
Energous Corp., ISRWO, PCT/US2016/068495, Mar. 30, 2017, 9 pgs.
Energous Corp., ISRWO, PCT/US2016/068498, May 17, 2017, 8 pgs.
Energous Corp., ISRWO, PCT/US2016/068504, Mar. 30, 2017, 8 pgs.
Energous Corp., ISRWO, PCT/US2016/068551, Mar. 17, 2017, 8 pgs.
Energous Corp., ISRWO, PCT/US2016/068565, Mar. 8, 2017, 11 pgs.
Energous Corp., ISRWO, PCT/US2016/068987, May 8, 2017, 10 pgs.
Energous Corp., ISRWO, PCT/US2016/068993, Mar. 13, 2017, 12 pgs.
Energous Corp., ISRWO, PCT/US2016/069313, Nov. 13, 2017, 10 pgs.
Energous Corp., ISRWO, PCT/US2016/069316, Mar. 16, 2017, 15 pgs.
Energous Corp., ISRWO, PCT/US2017/046800, Sep. 11, 2017, 13 pgs.
Energous Corp., ISRWO, PCT/US2017/065886, Apr. 6, 2018, 13 pgs.
Energous Corp., ISRWO, PCT/US2018/012806, Mar. 23, 2018, 9 pgs.
Energous Corp., ISRWO, PCT/US2018/025465, Jun. 22, 2018, 9 pgs.
Energous Corp., ISRWO, PCT/US2018/031768, Jul. 3, 2018, 9 pgs.
Energous Corp., ISRWO, PCT/US2018/031786, Aug. 8, 2018, 9 pgs.
Energous Corp., ISRWO, PCT/US2018/039334, Sep. 11, 2018, 9 pgs.
Energous Corp., ISRWO, PCT/US2018/051082, Dec. 12, 2018, 9 pgs.
Energous Corp., ISRWO, PCT/US2018/058178, Mar. 13, 2019, 10 pgs.
Energous Corp., ISRWO, PCT/US2018/064289, Apr. 25, 2019, 12 pgs.
Energous Corp., ISRWO, PCT/US2019/015820, May 14, 2019, 9 pgs.
Energous Corp., ISRWO, PCT/US2019/021817, Apr. 6, 2019, 11 pgs.
Energous Corp., ISRWO, PCT/US2019/039014, Oct. 4, 2019, 15 pgs.
Energous Corp., ISRWO, PCT/US2019/061445, Jan. 7, 2020, 19 pgs.
Energous Corp., ISRWO, PCT/US2020/067566, Apr. 27, 2021, 12 pgs.
Order Granting Reexamination Request, U.S. Appl. No. 90/013,793, filed Aug. 31, 2016, 23 pgs.
Notice of Intent to Issue Reexam Certificate: U.S. Appl. No. 90/013,793, filed Feb. 2, 2017, 8 pgs.
*Ossia Inc.* vs *Energous Corp.*, Declaration of Stephen B. Heppe in Support of Petition for Post-Grant Review of U.S. Pat. No. 9,124,125, PGR2016-00023, May 31, 2016, 144 pgs.
*Ossia Inc.* vs *Energous Corp.*, Declaration of Stephen B. Heppe in Support of Petition for Post-Grant Review of U.S. Pat. No. 9,124,125, PGR2016-00024, May 31, 2016, 122 pgs.
*Ossia Inc.* vs *Energous Corp.*, Patent Owner Preliminary Response, Sep. 8, 2016, 95 pgs.
*Ossia Inc.* vs *Energous Corp.*, Petition for Post Grant Review of U.S. Pat. No. 9,124,125, May 31, 2016, 86 pgs.
*Ossia Inc.* vs *Energous Corp.*, Petition for Post-Grant Review of U.S. Pat. No. 9,124,125, May 31, 2016, 92 pgs.
*Ossia Inc.* vs *Energous Corp.*, PGR2016-00023—Institution Decision, Nov. 29, 2016, 29 pgs.
*Ossia Inc.* vs *Energous Corp.*, PGR2016-00024—Institution Decision, Nov. 29, 2016, 50 pgs.
*Ossia Inc.* vs *Energous Corp.*, PGR2016-00024—Judgement-Adverse, Jan. 20, 2017, 3 pgs.
Adamiuk et al. "Compact, Dual-Polarized UWB-Antanna, Embedded in a Dielectric," IEEE Transactions on Antenna and Propagation, IEEE Service Center, Piscataway, NJ, US vol. 56, No. 2, Feb. 1, 2010, 8 pgs.
Gill et al. "A System for Change Detection and Human Recognition in Voxel Space using the Microsoft Kinect Sensor," 2011 IEEE Applied Imagery Pattern Recognition Workshop. 8 pgs.
Han et al. Enhanced Computer Vision with Microsoft Kinect Sensor: a Review, IEEE Transactions on Cybernetics vol. 43, No. 5, pp. 1318-1334, Oct. 3, 2013.

(56) References Cited

OTHER PUBLICATIONS

Hsieh et al. "Development of a Retrodirective Wireless Microwave Power Transmission System", IEEE, 2003 pp. 393-396.
Leabman "Adaptive Band-partitioning for Interference Cancellation in Communication System," Thesis Massachusetts Institute of Technology, Feb. 1997, pp. 1-70.
Li et al. High-Efficiency Switching-Mode Charger System Design Considerations with Dynamic Power Path Management, Mar./Apr. 2012 Issue, 8 pgs.
Mao et al. "BeamStar: an Edge-Based Approach to Routing in Wireless Sensors Networks", IEEE Transactions on Mobile Computing, IEEE Service Center, Los Alamitos, CA US, vol. 6, No. 11, Nov. 1, 2007, 13 pgs.
Mascarenas et al. "Experimental Studies of Using Wireless Energy Transmission for Powering Embedded Sensor Nodes," Nov. 28, 2009, Journal of Sound and Vibration, 13 pgs.
Mishra et al. "SIW-based Slot Array Antenna and Power Management Circuit for Wireless Energy Harvesting Applications", IEEE APSURSI, Jul. 2012, 2 pgs.
Nenzi et al "U-Helix: On-Chip Short Conical Antenna", 2013 7th European Conference on Antennas and Propagation (EUCAP), ISBN:978-1-4673-2187-7, IEEE, Apr. 8, 2013, 5 pgs.
Qing et al. "UHF Near-Field Segmented Loop Antennas with Enlarged Interrogation Zone," 2012 IEEE International Workshop on Antenna Technology (iWAT), Mar. 1, 2012, pp. 132-135, XP055572059, ISBN: 978-1-4673-0035-3.
Singh "Wireless Power Transfer Using Metamaterial Bonded Microstrip Antenna for Smart Grid WSN", Fourth International Conference on Advances in Computing and Communications (ICACC), Aug. 27-29, 2014, Abstract 1 pg.
Smolders "Broadband Microstrip Array Antennas" Institute of Electrical 1-15 and Electronics Engineers, Digest of the Antennas and Propagation Society International Symposium. Seattle, WA, Jun. 19-24, 1994, Abstract 3 pgs.
Van Veen et al., "Beamforming: a Versatile Approach to Spatial Filtering", IEEE, ASSP Magazine, Apr. 1988, pp. 4-24.
Wei et al. "Design of a Wideband Horizontally Polarized Omnidirectional Printed Loop Antenna," IEEE Antennas and Wireless Propagation Letters, vol. 11, Jan. 3, 2012, 4 pgs.
Zeng et al. "A Compact Fractal Loop Rectenna for RF Energy Harvesting," IEEE Antennas and Wireless Propagation Letters, vol. 16, Jun. 26, 2017, 4 pgs.
Zhai et al. "A Practical Wireless Charging System Based on Ultra-Wideband Retro-Reflective Beamforming" 2010 IEEE Antennas and Propagation Society International Symposium, Toronto, ON 2010, 4 pgs.
Energous Corp., IPRP, PCT/US2020/067566, Jul. 5, 2022, 8 pgs.
Energous Corp., ISRWO, PCT/US2021/027140, Jul. 21, 2021, 9 pgs.
Energous Corp., IPRP, PCT/US2021/027140, Oct. 13, 2022, 5 pgs.

\* cited by examiner

Without Non-Radiating Element

With Non-Radiating Element

WIRELESS-POWER TRANSMITTING DEVICE FOR CREATING A UNIFORM NEAR-FIELD CHARGING AREA

This application claims priority to U.S. Provisional Application Ser. No. 63/009,361, filed Apr. 13, 2020, entitled "Wireless-Power Transmitting Device For Creating A Uniform Near-Field Charging Area," which is incorporated by reference herein in its entirety

TECHNICAL FIELD

The present disclosure relates generally to wireless power transmission, and more particularly to radiating antennas (e.g., non-inductive, resonant near-field antennas coupled with a feed line) paired with non-radiating elements (e.g., elements not coupled with a feed line) for increasing the locations at which a receiver device can harness usable power on a charging surface.

BACKGROUND

Portable electronic devices such as smartphones, tablets, notebooks, audio output devices and other electronic devices have become a necessity for communicating and interacting with others. The frequent use of portable electronic devices, however, requires a significant amount of power, which quickly depletes the batteries attached to these devices. Inductive charging pads and corresponding inductive coils in portable devices allow users to wirelessly charge a device by placing the device at a particular position on an inductive pad to allow for a contact-based charging of the device.

Conventional inductive charging pads, however, suffer from many drawbacks. For one, users typically must place their devices at a specific position and in a certain orientation on the charging pad because gaps ("dead zones" or "cold zones") exist on the surface of the charging pad. In other words, for optimal charging, the coil in the charging pad needs to be aligned with the coil in the device in order for the required magnetic coupling to occur. Additionally, placement of other metallic objects near an inductive charging pad may interfere with operation of the inductive charging pad, so even if the user places their device at the exact right position, if another metal object is also on the pad, then magnetic coupling still may not occur and the device will not be charged by the inductive charging pad. This results in a frustrating experience for many users, as they may be unable to properly charge their devices. Also, inductive charging requires a relatively large receiver coil to be placed within a device to be charged, which is less than ideal for devices where internal space is at a premium.

Further, while near-field radio-frequency-based transmission techniques have also been explored, some of these techniques result in formation of charging areas that are insufficiently uniform to allow for a placing a device to-be-charge at any position on the charging surface.

SUMMARY

Accordingly, there is a need for a near-field charging system that addresses the problems identified above. To this end, systems and methods described herein are capable of increasing the usable charging area on a charging surface, which allows users more flexibility to place their devices to be charged at various positions on the charging surface. In some embodiments, the usable charging area on the charging surface is improved by placing a non-radiating element between a charging surface and a radiating antenna.

(A1) In some embodiments, a near-field charging system comprising a housing is provided. The housing includes a charging surface and at least one other surface, a radiating antenna, and a non-radiating element positioned above the radiating antenna within the housing such that the non-radiating element is closer to the charging surface than the radiating antenna. The radiating antenna is configured to produce a first electromagnetic field distribution that is configured to be received by a wireless-power receiver placed on the charging surface of the housing, and the first electromagnetic field distribution is configured to provide at least 200 Milliwatts of usable power to the wireless-power receiver when the wireless-power receiver is placed at any position on a first portion of the charging surface of the housing. In addition, the non-radiating element is configured to change a distribution characteristic of the first electromagnetic field distribution to produce a second electromagnetic field distribution, and the second electromagnetic field distribution is configured to provide at least 200 milliwatts of usable power to the wireless-power receiver when the wireless-power receiver is placed at any position across a second portion of the charging surface of the housing. The second portion can be at least 10% percent greater than the first portion.

(A2) In some embodiments of the near-field charging system of A1, the second electromagnetic field distribution is configured to provide at least 220 Milliwatts of usable power to the wireless-power receiver when the wireless-power receiver is placed at any position across a second portion of the charging surface of the housing.

(A3) In some embodiments of the near-field charging system of A1, the second electromagnetic field distribution is configured to provide at least 1 watt of usable power to the wireless-power receiver when the wireless-power receiver is placed at any position across a second portion of the charging surface of the housing.

(A4) In some embodiments of the near-field charging system of A1, the second electromagnetic field distribution is configured to provide at least 5 watts of usable power to the wireless-power receiver when the wireless-power receiver is placed at any position across a second portion of the charging surface of the housing.

(A5) In some embodiments of the near-field charging system of A1, the first portion of the charging surface of the housing covers an area that includes 70% of the surface area of the charging surface.

(A6) In some embodiments of the near-field charging system of A1, the radiating antenna is configured to produce a first reflection coefficient, and positioning the non-radiating element above the radiating antenna within the housing such that the non-radiating element is closer to the charging surface than the radiating antenna, the radiating antenna is configured to produce a second reflection coefficient that is 12% less than the first reflection coefficient, thereby causing a reduction in return losses for the near-field charging system.

(A7) In some embodiments of the near-field charging system of A6, the second reflection coefficient varies between −13 dB and −16 dB.

(A8) In some embodiments of the near-field charging system of A6, the second reflection coefficient is less than −10 dB.

(A9) In some embodiments of the near-field charging system of A1, the second electromagnetic field distribution is configured to provide more than 200 Milliwatts of usable power to the wireless-power receiver at fewer locations on the charging surface of the housing relative to the first electromagnetic field distribution.

(A10) In some embodiments of the near-field charging system of A1, the charging surface has a depression configured to receive and partially house an audio output device. The wireless-power receiver can be coupled to the audio output device, and the wireless power receiver is configured to provide the at least 200 Milliwatts of usable power to the audio output device for charging or powering purposes.

(A11) In some embodiments of the near-field charging system of A10, the audio output device is a single in-ear audio output device.

(A12) In some embodiments of the near-field charging system of A1, the radiating antenna has a shape, and the radiating antenna is oriented to have a first orientation within the housing; and the non-radiating element has the shape and the first orientation within the housing.

(A13) In some embodiments of the near-field charging system of A1, the radiating antenna has a shape and the radiating antenna is oriented to have a first orientation within the housing; the non-radiating element has: the same shape; and a second orientation within the housing that is different from the first orientation.

(A14) In some embodiments of the near-field charging system of A1, the radiating antenna is connected to a power feed line, and the non-radiating element is not connected to a power feed line.

(A15) In some embodiments of the near-field charging system of A1, a non-conducting material is placed between the radiating antenna and the non-radiating element, wherein the non-conducting material electrically isolates the radiating antenna from the non-radiating element.

(A16) In some embodiments of the near-field charging system of A1, the radiating antenna and the non-radiating element both have a same radiating antenna design selected from the group consisting of: a PIFA antenna design, a patch antenna design, and a dipole antenna design.

(A17) In some embodiments of the near-field charging system of A1, the non-radiating element is positioned at least 1 millimeter above the radiating antenna within the housing such that the non-radiating element is closer to the charging surface than the radiating antenna.

(B1) In yet another aspect, a method of constructing a near-field charging system that increases usable wireless charging area available to a wireless-power receiver, the method comprising: providing a housing that includes a charging surface and at least one other surface a radiating antenna; placing a radiating antenna within the housing, the radiating antenna configured to produce a first electromagnetic field distribution that is configured to be received by a wireless-power receiver placed on the charging surface of the housing, the first electromagnetic field distribution is configured to provide at least 200 Milliwatts of usable power to the wireless-power receiver when the wireless-power receiver is placed at any position on a first portion of the charging surface of the housing; placing a non-radiating element in a position above the radiating antenna within the housing such that the non-radiating element is closer to the charging surface than the radiating antenna, wherein placing the non-radiating element in the position above the radiating antenna within the housing changes a distribution characteristic of the first electromagnetic field distribution to produce a second electromagnetic field distribution, the second electromagnetic field distribution is configured to provide at least 200 Milliwatts of usable power to the wireless-power receiver when the wireless-power receiver is placed at any position across a second portion of the charging surface of the housing, wherein the second portion is at least 10% percent greater than the first portion.

(B2) In some embodiments of the method of B1, additional constructing/producing steps are performed so that the resulting near-field charging system is in accordance with any one of A2-A18.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

FIGS. 5A-1 and 5A-2 show plots of the return loss when a non-radiating element is not added to the charging system, in accordance with some embodiments.

FIGS. 5B-1 and 5B-2 show plots of the return loss when a non-radiating element is added to the charging system, in accordance with some embodiments.

Figure 1:
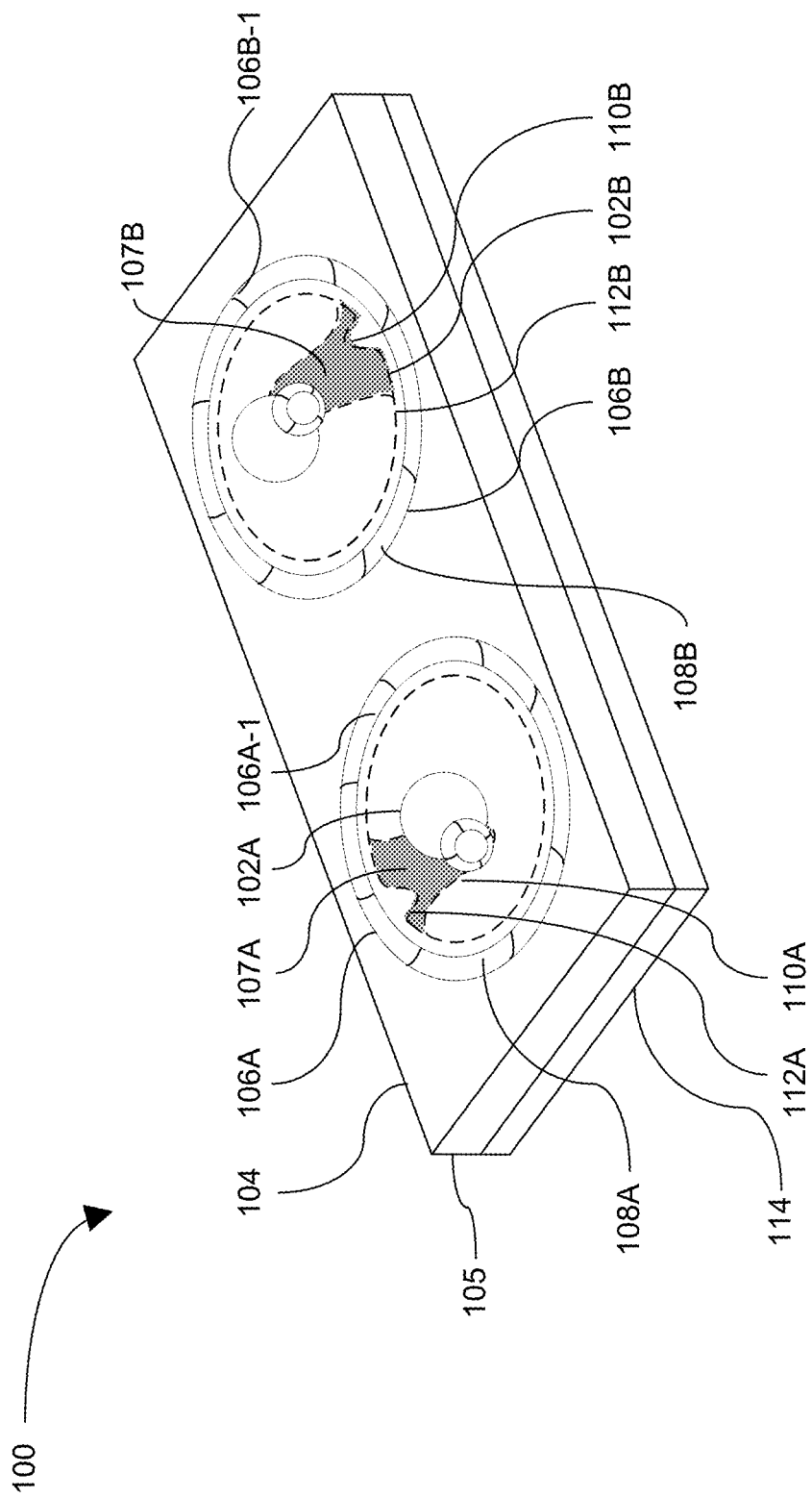
FIG. 1 shows a diagram of an example embodiment of a near field charging system for charging a pair of headphones or hearing aids.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not been described in exhaustive detail so as not to unnecessarily obscure pertinent aspects of the embodiments described herein.

FIG. 1 shows an illustration of a representative near-field charging system 100 that is configured to charge an electronic device (e.g., headphones, cellphones, tablets, and/or other electronic devices) or a pair of associated electronic devices (e.g., a pair of earbuds, a pair of hearing aids, etc.). The design of a near-field charging system 100 is illustrated in a particular way for ease of illustration and one skilled in the art will appreciate that other designs are possible. For example, the overall size of the charging system 100 can be varied to be appropriate for the device(s) that is being charged.

As electronic devices shift to wireless designs (e.g., wireless audio output devices 102A and 102B, which in some embodiments are hearing aids, or earbuds) that require them to be charged daily, there has become a need for a convenient way to charge all these devices. Traditional methods have required specialized charging cases that require electronic devices to be oriented in a specific manner and placed at a specific position to receive power and get charged. Having a charging surface that can charge wireless devices without regard to the orientation of the wireless devices on the charging surface, similar to the near-field charging system 100 shown in FIG. 1, is highly convenient. Such an approach does not involve specialized cases, the user can simply place the devices they wish to be charged on the charging surface at any position and/or orientation, and not perform any additional action (e.g., the user could just drop the earbuds down on the charging surface).

Specifically, FIG. 1 shows a representative near-field charging system that has a charging surface that can charge wireless devices (e.g., audio output devices 102A and 102B such as wireless earphones) without regard to the orientation of the wireless devices on the charging surface. Near-field charging system 100 in FIG. 1 includes a housing 104 that has multiple charging surfaces (e.g., charging surfaces 106A and 106B) disposed upon a top surface 105 of the housing 104. In this illustrated embodiment, charging surfaces 106A and 106B are indicated to the user by depressions 108A and 108B, respectively. Furthermore, the components under the charging surface (shown in FIG. 2) are configured to output enough Radio Frequency (RF) energy that when the RF energy is rectified by a receiving device (specific receiving device that is configured to receive 200 mW from the charging system), the receiving device receives 200 mW of usable power. It should also be appreciated that 200 mW is just one configuration to charge audio output devices 102A and 102B (e.g., headphones, earbuds, hearing aids, etc.,) and the usable power may be adjusted based on the different power-consumption demands of other electronic devices (e.g., 500 mW of usable power may be sufficient to charge a cellphone). In some embodiments, usable power is the power required to concurrently power or charge an electronic device that is in an active state (e.g., the electronic device is operating in a powered on state, and the device fully charges in a reasonable amount of time (e.g., 1 to 2 hours)). To illustrate the charging surfaces depressions 106A-1 and 106B-1 are shown to correspond with the charging surfaces 106A and 106B, respectively.

Although two charging surfaces are shown in a specific orientation, any orientation of charging surfaces is possible depending on the requirements of the electronic device(s). For example, in some embodiments, charging surfaces 106A and 106B can overlap or be perfectly adjacent to each other to make a continuous charging surface. FIG. 1 also shows two reduced-charging-areas 110A and 110B and two increased-charging-areas 112A and 112B. These two reduced-charging-areas 110A and 110B illustrate the reduced charging surface area that results if the housing 104 includes a radiating antenna and does not include a non-radiating element within the housing as well. The two increased-charging-areas 112A and 112B illustrate the increased charging surface area that results when a non-radiating elements 202A and 202B in FIG. 2 (which are analogous to elements 711-A-711-N in FIG. 7) are placed between radiating antennas 204A and 204B in FIG. 2 (which are analogous to Antennas 710-A-710-N in FIG. 7) and charging surfaces 106A and 106B, respectively. FIG. 1 also shows a bottom surface 114 of the housing 104, which helps contain the components described in FIG. 2. To further illustrate the increased charging area, the shaded regions 107A and 107B (e.g., dead zones) show the locations at which usable power is available as a result of adding the non-radiating elements. As illustrated by the shaded regions 107A and 107B, by positioning the non-radiating element 202A and 202B above the radiating elements 204A and 204B, the shaded regions (e.g., dead zones) now become a usable area for charging an electronic device, thereby making the overall charging area more uniform across the entirety of the charging surfaces 106.

Figure 2:
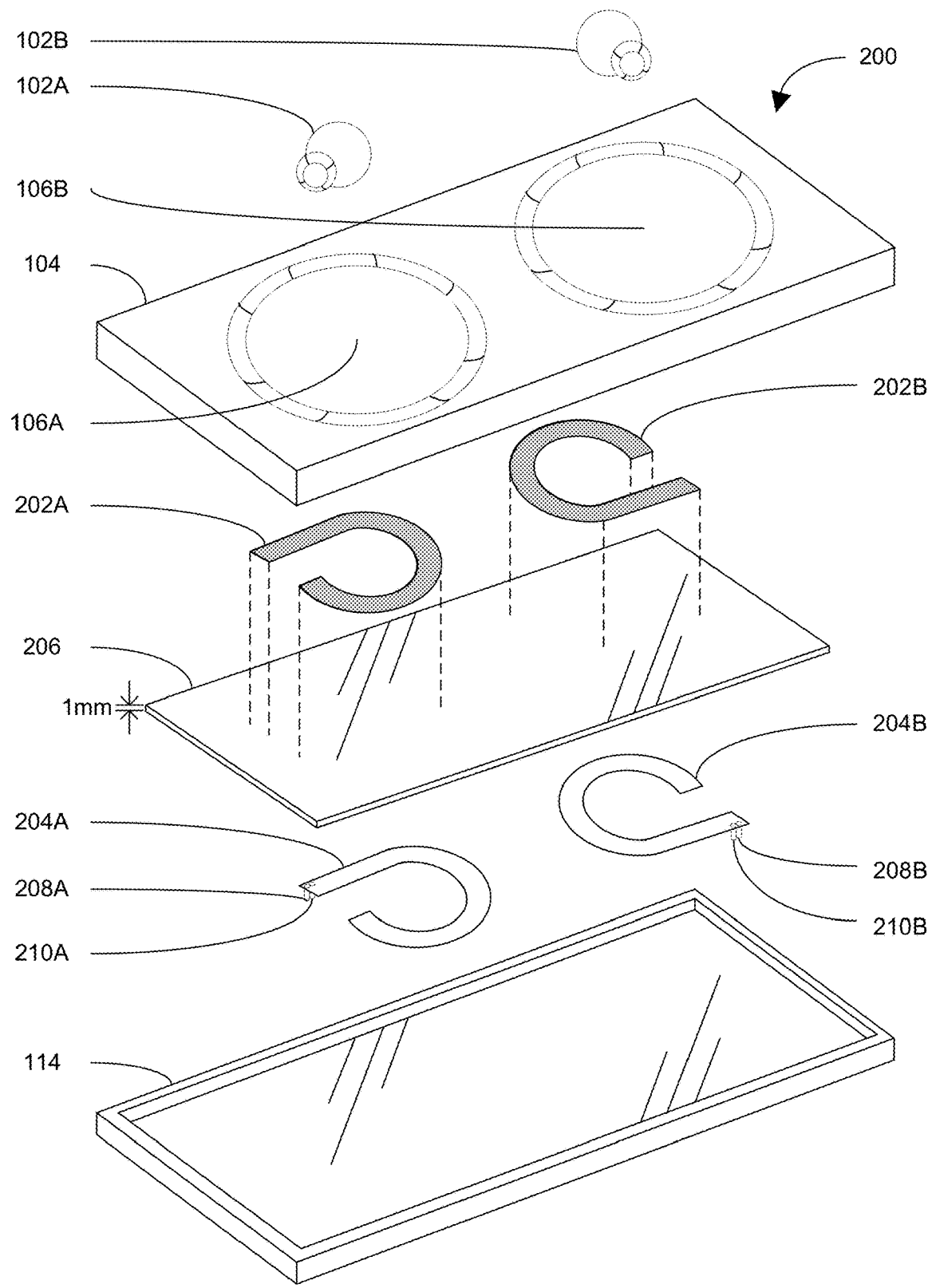
FIG. 2 shows a diagram of an exploded view of a near field charging system for charging a pair of headphones or hearing aids, in accordance with some embodiments.

FIG. 2 shows an exploded view 200 of a near-field charging system 100. As briefly described above, the inventive near-field charging system 100 produces a uniform charging surface with minimal dead spots. In some embodiments, this is achieved by causing a change to a radiating antenna's electromagnetic field (i.e., electric field distribution, magnetic field distribution, or current distribution) by placing a non-radiating element (e.g., a PIFA antenna design, a patch antenna design, and a dipole antenna design that are all electrically isolated from a power source) above the radiating antenna. Stated another way, the non-radiating element can change a distribution characteristic of the radiating element's electromagnetic field distribution to produce another electromagnetic field distribution that produces a uniform charging area across the charging surface.

Specifically, FIG. 2 shows components of a near-field charging system 100 capable of charging wireless audio output devices 102A and 102B. As shown in FIG. 2 (and as was also described above with reference to FIG. 1), a housing 104 has charging surfaces 106A and 106B. Beneath each of charging surfaces 106A and 106B is a non-radiating element (e.g., an element that is not connected to a power feed line or a ground line). The non-radiating elements are shown in FIG. 2 as 202A and 202B, and these non-radiating elements are placed below charging surfaces 106A and 106B, respectively, within the housing 104. In some embodiments, the non-radiating elements 202A and 202B can be printed on a top surface of a circuit board 206. In such embodiments, circuit board 206 can be made of a non-conducting material (e.g., a dielectric substrate or plastic) that electrically isolates non-radiating elements 202A and 202B from power sources and ground. To help encourage equal distribution of usable energy across charging surfaces 106A and 106B (when the radiating antennas 204A and 204B are radiating RF energy), the circuit board 206 should have a thickness of at least 1 millimeter to 5 millimeters.

FIG. 2 also shows two radiating antennas 204A and 204B placed (e.g., in some embodiments, printed) on the bottom side (i.e., opposite) of the circuit board 206 to electrically isolate radiating antennas 204A and 204B, which in some embodiments have a direct connection to the power source (s) and ground(s), from the non-radiating elements 202A and 202B. In the illustrated embodiment, non-radiating elements 202A and 202B have the same design, size, and orientation in the housing (housing 104) as radiating antennas 204A and 204B. A person of skill in the art, upon reading the present disclosure, will appreciate that the designs do not need to match, and even if the designs do match, they do not need to be the same size (e.g., the radiating antenna can be 1% smaller than the non-radiating element, or the radiating antenna can be 5% larger than the non-radiating element). Radiating antennas 204A and 204B are also connected to power feed lines 210A and 210B, respectively, and grounds 208A and 208B, respectively.

Figure 3A:
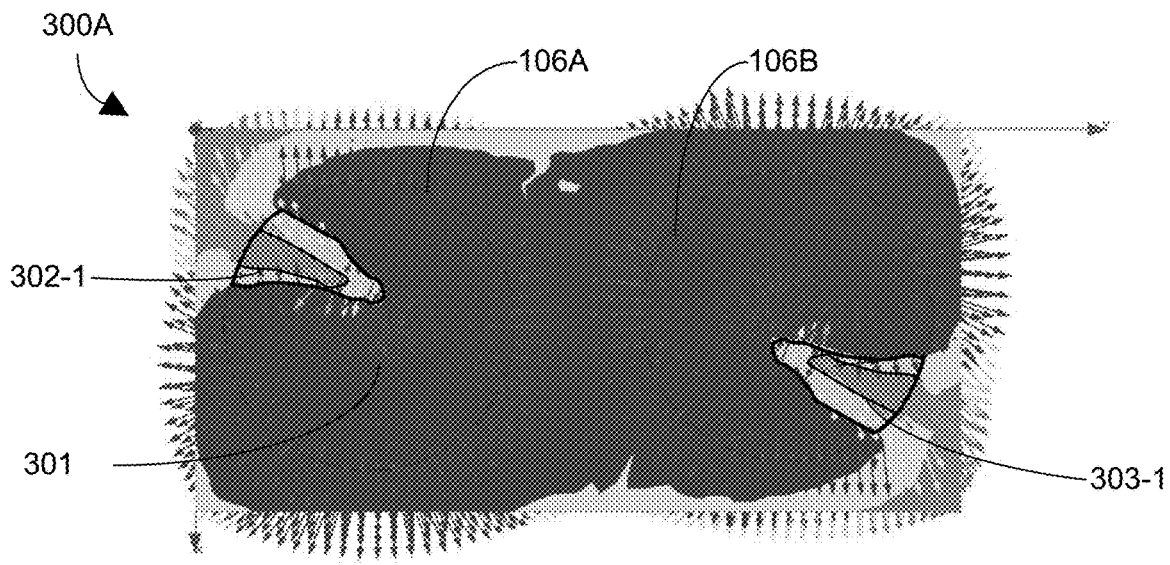
FIG. 3A shows an illustration of a electromagnetic field plot produced by a near field charging system, in accordance with some embodiments.

As discussed above, the radiating antennas 204A and 204B each produce a first electromagnetic field distribution when there is no non-radiating element positioned above the radiating antennas. This electromagnetic field distribution is shown in FIG. 3A, which shows a electric field distribution plot 300A on a two dimensional plane that is coplanar with charging surfaces 106A and 106B. The electromagnetic field plot 300A shows the electromagnetic field output by the radiating antennas 204A and 204B without having a non-radiating elements 202A and 202B placed in-between the radiating antennas 204A and 204B and the charging surfaces 106A and 106B. As shown in electromagnetic field plot 300A, cold zones (also referred to as dead zones) are present on the charging surfaces (e.g., for purposes of this disclosure, cold zones are areas on the charging surface at which a device to-be-charged would receive an insufficient amount of usable power to power the device or to provide enough power to charge a power source/battery of the device). Cold zones 302-1 and 303-1 indicate positions at which usable power can be improved. Due to presence of these cold zones, the usable charging area on the charging surfaces 106A and 106B can be said to be non-uniform.

Figure 3B:
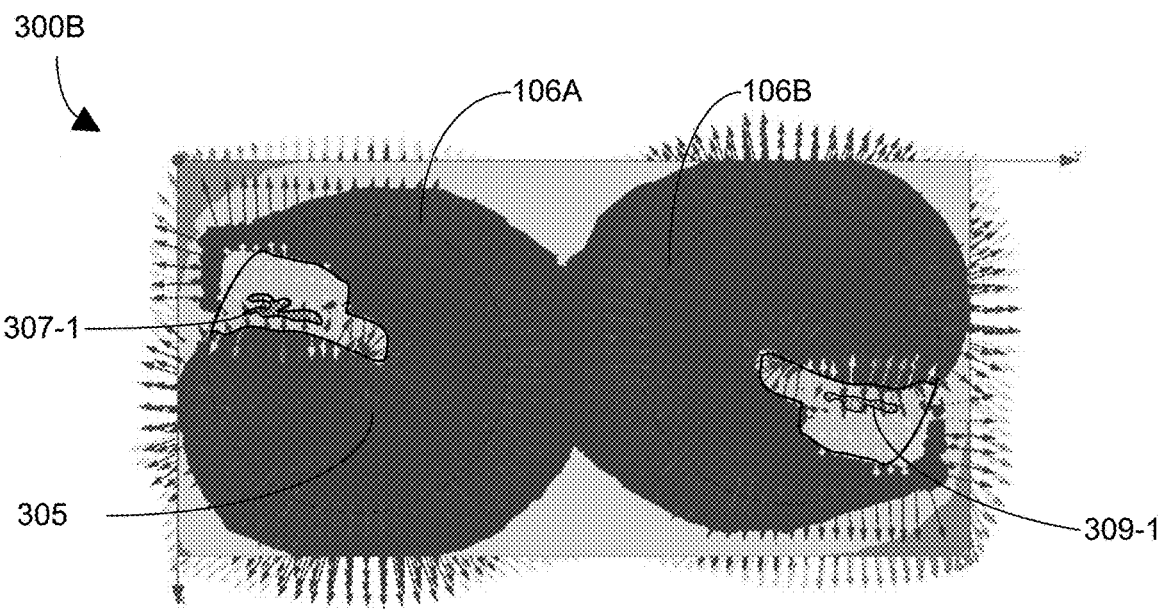
FIG. 3B shows an illustration of a electromagnetic field plot produced by a near field charging system, in accordance with some embodiments.

To improve the uniformity of available usable power on the charging surfaces 106A and 106B, non-radiating elements 202A and 202B are placed between the radiating antennas 204A and 204B and the charging surfaces 106A and 106B, respectively Placement of the non-radiating elements 202A and 202B above the radiating elements 204A and 204B, respectively, causes a change in the electromagnetic field distributions produced, thereby causing the radiating elements to each produce a second (different) electromagnetic field distribution rather than the first electromagnetic field distribution discussed above. The resulting electric field distribution plot 300B (which corresponds to the second electromagnetic field distribution produced by each of the radiating elements) is shown in FIG. 3B. As illustrated, cold zones now occupy a far smaller area of each of the charging surfaces. In particular, cold zone 307-1 is significantly smaller than cold zone 302-1, and cold zone 309-1 is significantly smaller than cold zone 303-1. In some embodiments, each cold zones is reduced in size by approximately 80-90%.

Figures 4A, 4B:
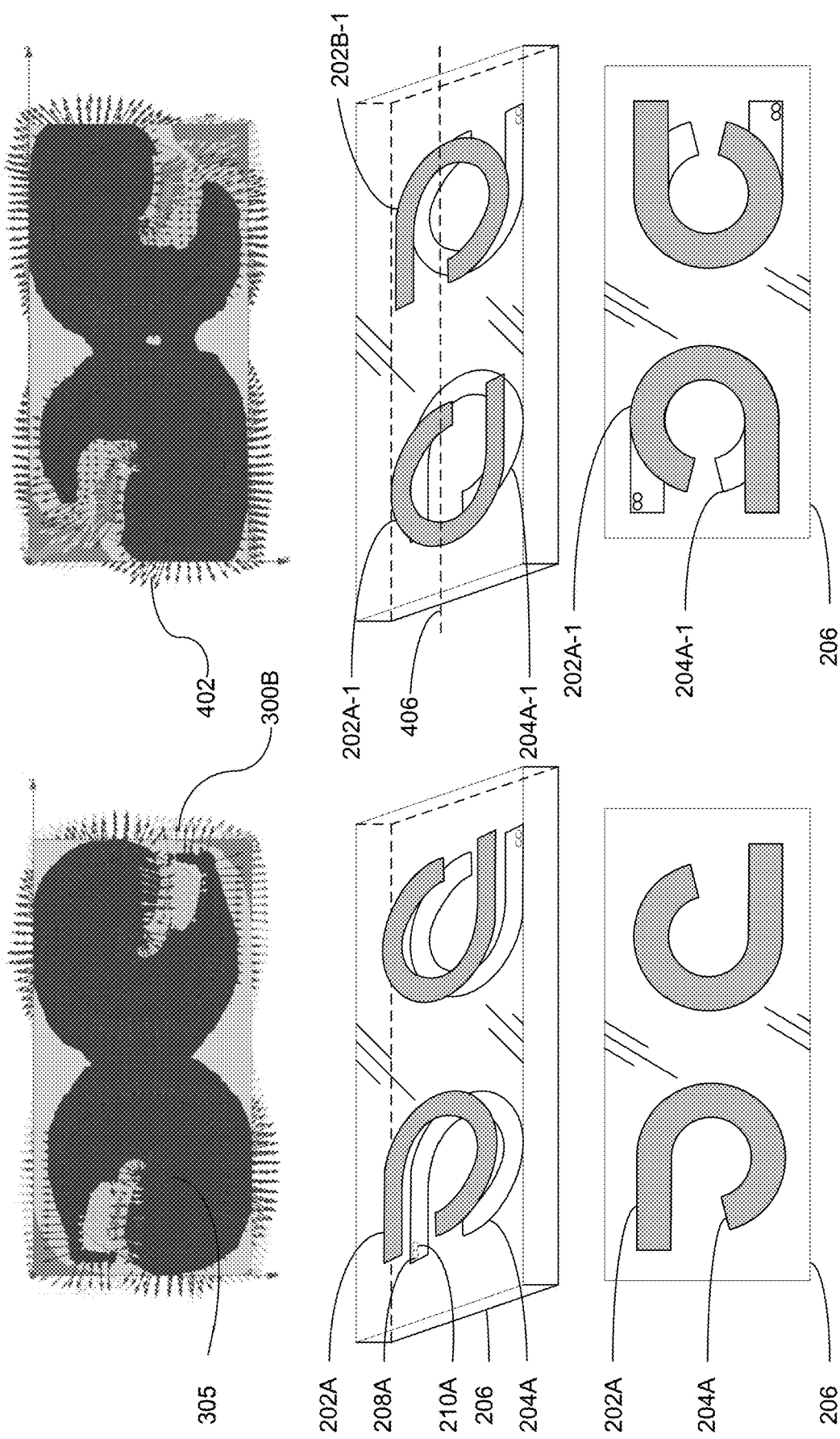
FIG. 4A shows an illustration of a electromagnetic field plot produced by a near field charging system when a non-radiating element has a first orientation.
FIG. 4B shows an illustration of a electromagnetic field plot produced by a near field charging system when a non-radiating element has a second orientation, in accordance with some embodiments.

FIG. 4A shows the same resulting electromagnetic field plot 300B as shown in FIG. 3B. This electromagnetic field plot 300B, as discussed in relation with FIG. 3B shows that adding non-radiating elements 202A and 202B between the radiating antennas 204A and 204B and the charging surfaces 106A and 106B can increase the locations on charging surfaces 106A and 106B that have sufficient usable power (stated another way, and as discussed above, the size of a cold zone on each charging surface is reduced significantly).

While one orientation of non-radiating elements 202A and 202B within the housing 104 is shown in FIGS. 2 and 4A, other possible orientations of non-radiating elements 202A and 202B within the housing 104 are possible. Changes in orientation of the non-radiating elements 202A and 202B can change the resulting electromagnetic field distribution produced by the corresponding radiating elements in the presence of the non-radiating elements.

For example, FIG. 4B shows another possible orientation of non-radiating elements, one in which non-radiating elements 202A and 202B are flipped about horizontal axis 406 (stated another way, the non-radiating elements are rotated 180 degrees relative to the orientation of the non-radiating elements in FIG. 4A). These flipped/rotated non-radiating elements are shown in FIG. 4B as flipped-non-radiating elements 202A-1 and 202B-1. FIG. 4B also shows the resulting electromagnetic field plot 402 produced by this combination of flipped-non-radiating elements 202A-1 and 202B-1 and radiating elements 204A and 204B, which illustrates how the electromagnetic field distributions produced by the radiating elements are altered in response to flipping of the orientations of the non-radiating elements 202A and 202B. In some embodiments, one of the reasons why the non-radiating elements results in a more uniform charging surface is that the non-radiating elements stabilize the return loss for the charging system 100 and additionally keeps the return loss lower. In some embodiments, a low and stable return loss ensures that maximum power is transmitted via the charging system 100 and made available at the charging surfaces 106A and 106B. In some embodiments, without the non-radiating elements, the radiating antennas 204A and 204B would have a return loss that fluctuates as the location of the audio output devices 102A and 102B changes on the charging surfaces. In some embodiments, when the return loss is high, not enough power is available for charging the electronic devices.

Figures 1, 2, 5A:
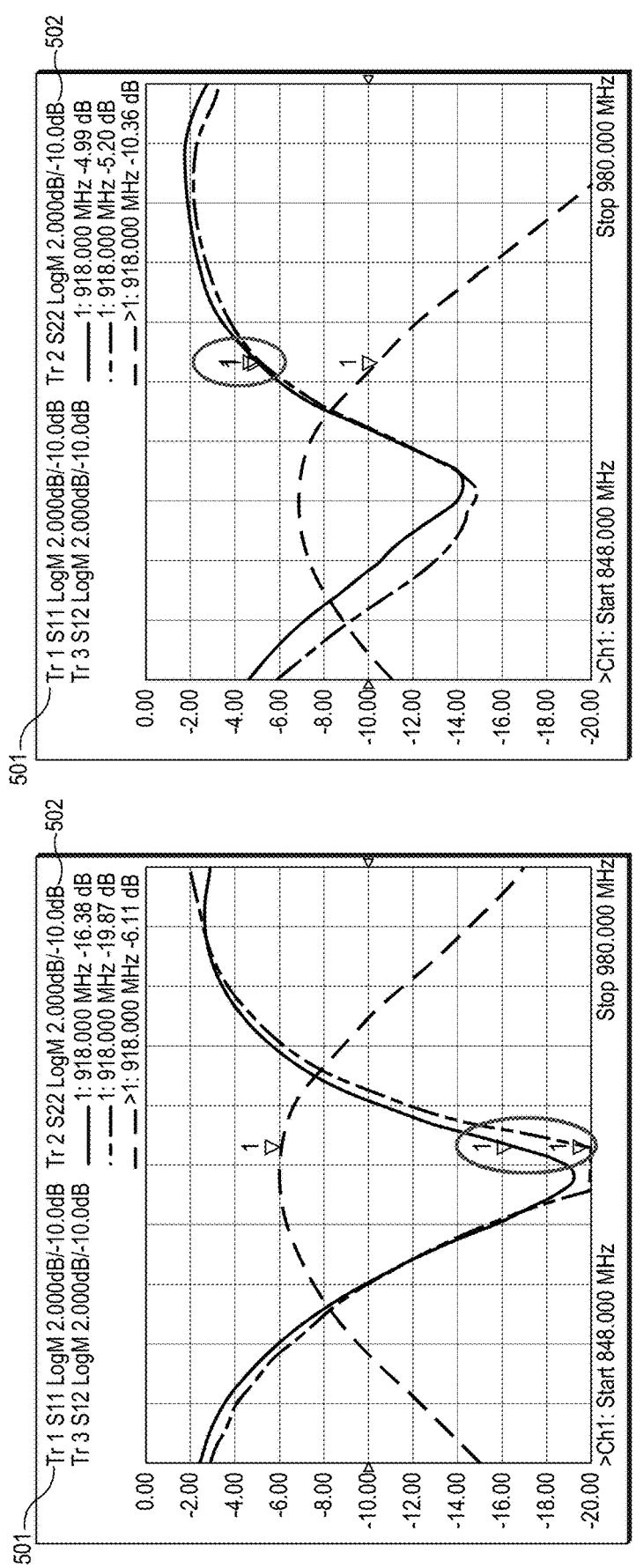

FIGS. 5A-1, 5A-2, 5B-1, and 5B-2 show plots of return losses, which show that adding non-radiating elements 202A and 202B between the radiating antennas 204A and 204B and the charging surfaces 106A and 106B can reduce the amount of irregular variation in return loss at the near-field charging system 100 as the location of the audio output devices 102A and 102B is varied. FIGS. 5A-1 and 5A-2 illustrate the wireless charger transmitter system without the non-radiating elements 202A and 202B (e.g., parasitic elements). FIGS. 5A-1 and 5A-2 show a large variation in the reflection coefficient. In FIGS. 5A-1 and 5A-2 "S11" and "S22" indicated by 501 and 502, respectively, indicate the reflection coefficients corresponding to the two radiating elements. The plots in FIGS. 5A-1 and 5A-2 show the reflection coefficients as the audio output devices 102A and 102B (e.g., two earbuds) are placed at different locations across the charging surfaces. FIG. 5A-1 shows that in some embodiments, the best case for reflection coefficient is: S11=−16.38 dB, S22=−19.87 dB. FIG. 5A-2 shows that in some embodiments, the worst case for reflection coefficient: S11=−4.99 dB, S22=−5.20 dB.

Figures 1, 2, 5B:
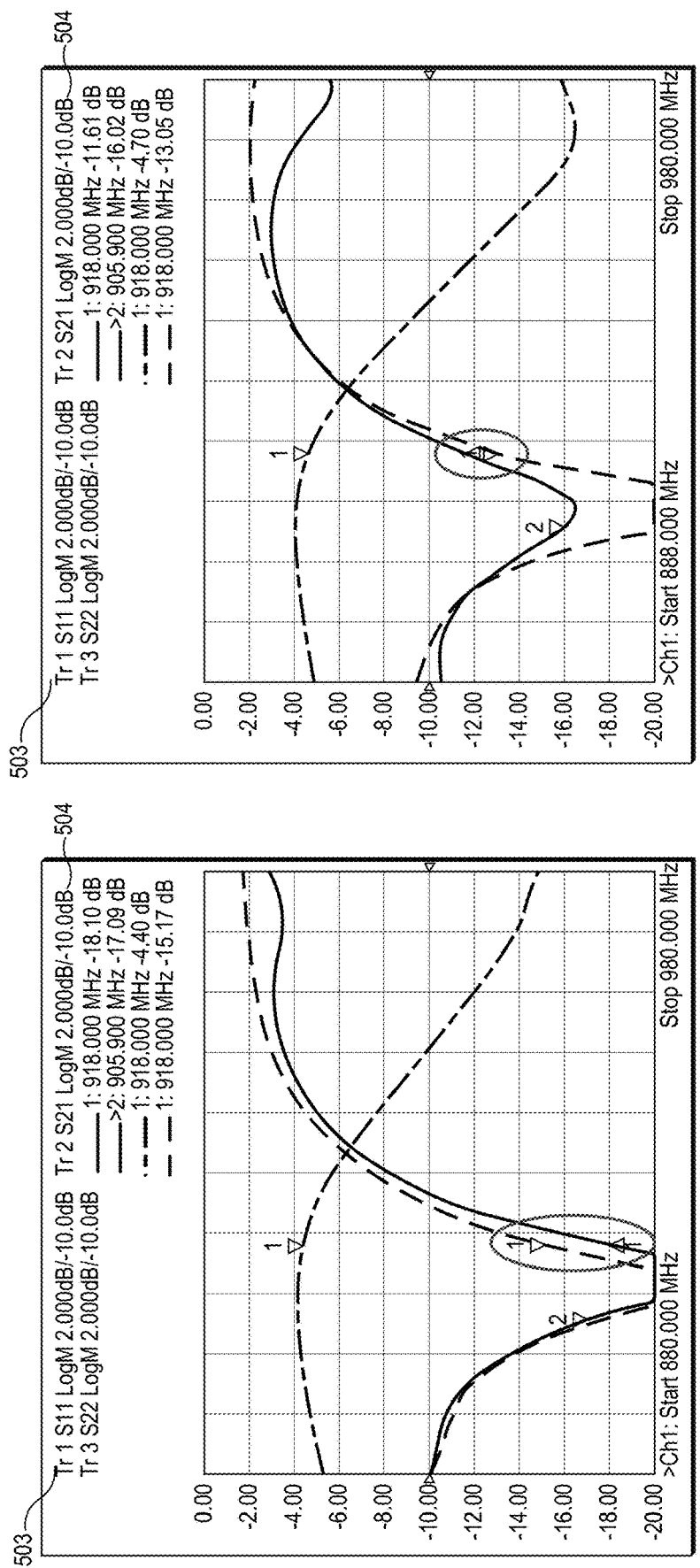

In contrast to FIGS. 5A-1 and 5A-2, FIG. 5B-1 and 5B-2 illustrate the wireless charger transmitter system with the non-radiating elements 202A and 202B (e.g., parasitic elements). FIGS. 5B-1 and 5B-2 show a small variation in the reflection coefficient. In FIGS. 5B-1 and 5B-2 "S11" and "S22" indicated by 503 and 504, respectively, indicate the reflection coefficients corresponding to the two radiating elements. The plots in FIGS. 5B-1 and 5B-2 show the reflection coefficients as the audio output devices 102A and 102B (e.g., two earbuds) are placed at different locations across the charging surfaces. FIG. 5B-1 shows that in some embodiments, the best case for reflection coefficient is: S11=−18.10 dB, S22=−15.17 dB. FIG. 5B-2 shows that in some embodiments, the worst case for reflection coefficient: S11=−11.61 dB, S22=−13.05 dB.

Figure 6:
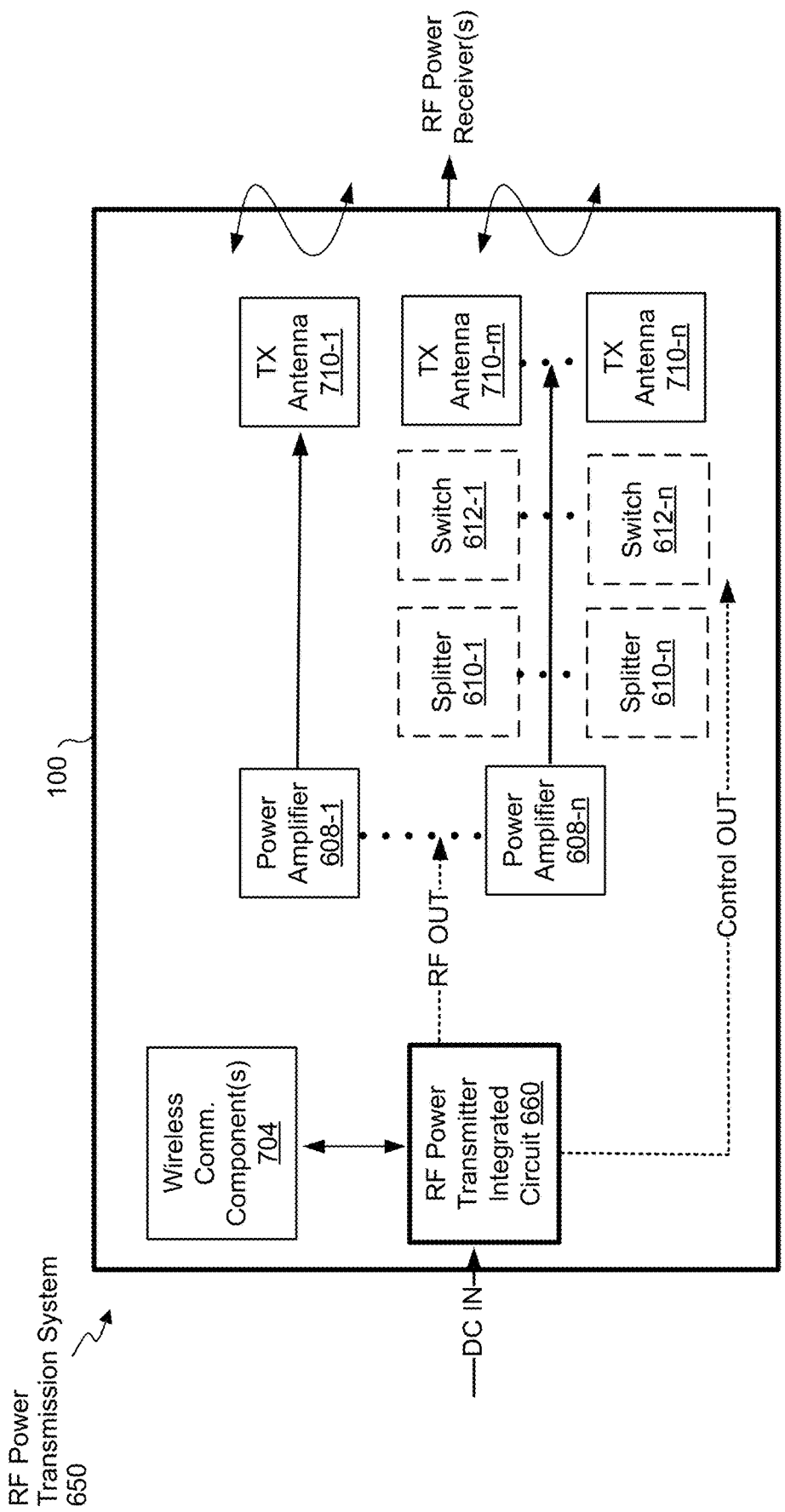
FIG. 6 is a block diagram of an RF wireless-power transmission system, in accordance with some embodiments.

While the above descriptions focused on the radiating and non-radiating elements of the inventive near-field charging system 100 for illustrative purposes, one of skill in the art will also appreciate that additional components are used to safely control the transmission of wireless power by the near-field charging system 100. For instance, additional components of the near-field charging system 100 are shown in FIG. 6.

A transmitter can determine the present SAR value of RF energy at one or more particular locations of the transmission field using one or more sampling or measurement techniques. In some embodiments, the SAR values within the transmission field are measured and pre-determined by SAR value measurement equipment. In some implementations, the transmitter may be preloaded with values, tables, and/or algorithms that indicate for the transmitter which distance ranges in the transmission field are likely to exceed to a pre-stored SAR threshold value. In some implementations, the transmitter may be preloaded with values, tables, and/or algorithms that indicate for the transmitter which radiation profiles within the transmission field are likely to exceed to a pre-stored SAR threshold value. For example, a lookup table may indicate that the SAR value for a volume of space (V) located some distance (D) from the transmitter receiving a number of power waves (P) having a particular frequency (F). One skilled in the art, upon reading the present disclosure, will appreciate that there are any number of potential calculations, which may use any number of variables, to determine the SAR value of RF energy at a particular locations, each of which is within the scope of this disclosure.

Moreover, a transmitter may apply the SAR values identified for particular locations in various ways when generating, transmitting, or adjusting the radiation profile. An SAR value at or below 1.6 W/kg, is in compliance with the FCC (Federal Communications Commission) SAR requirement in the United States. A SAR value at or below 2 W/kg is in compliance with the IEC (International Electrotechnical Commission) SAR requirement in the European Union. In some embodiments, the SAR values may be measured and used by the transmitter to maintain a constant energy level throughout the transmission field, where the energy level is both safely below a SAR threshold value but still contains enough RF energy for the receivers to effectively convert into electrical power that is sufficient to power an associated device, and/or charge a battery. In some embodiments, the transmitter may proactively modulate the radiation profiles based upon the energy expected to result from newly formed radiation profiles based upon the predetermined SAR threshold values. For example, after determining how to generate or adjust the radiation profiles, but prior to actually transmitting the power, the transmitter may determine whether the radiation profiles to be generated will result in RF energy accumulation at a particular location that either satisfies or fails the SAR threshold. Additionally or alternatively, in some embodiments, the transmitter may actively monitor the transmission field to reactively adjust power waves transmitted to or through a particular location when the transmitter determines that the power waves passing through or accumulating at the particular location fail the SAR threshold. Where the transmitter is configured to proactively and reactively adjust the power radiation profile, with the goal of maintaining a continuous power level throughout the transmission field, the transmitter may be configured to proactively adjust the power radiation profile to be transmitted to a particular location to be certain the power waves will satisfy the SAR threshold, but may also continuously poll the SAR values at locations throughout the transmission field (e.g., using one or more sensors configured to measure such SAR values) to determine whether the SAR values for power waves accumulating at or passing through particular locations unexpectedly fail the SAR threshold.

In some embodiments, control systems of transmitters adhere to electromagnetic field (EMF) exposure protection standards for human subjects. Maximum exposure limits are defined by US and European standards in terms of power density limits and electric field limits (as well as magnetic field limits). These include, for example, limits established by the Federal Communications Commission (FCC) for MPE, and limits established by European regulators for radiation exposure. Limits established by the FCC for MPE are codified at 47 CFR § 1.1310. For electromagnetic field (EMF) frequencies in the microwave range, power density can be used to express an intensity of exposure. Power density is defined as power per unit area. For example, power density can be commonly expressed in terms of watts per square meter (W/m2), milliwatts per square centimeter (mW/cm2), or microwatts per square centimeter (μW/cm2).

In some embodiments, and as a non-limiting example, the wireless-power transmission systems disclosed herein comply with FCC Part § 18.107 requirement which specifies "Industrial, scientific, and medical (ISM) equipment. Equipment or appliances designed to generate and use locally RF energy for industrial, scientific, medical, domestic or similar purposes, excluding applications in the field of telecommunication." In some embodiments, the wireless-power transmission systems disclosed herein comply with ITU (International Telecommunication Union) Radio Regulations which specifies "industrial, scientific and medical (ISM) applications (of radio frequency energy): Operation of equipment or appliances designed to generate and use locally radio frequency energy for industrial, scientific, medical, domestic or similar purposes, excluding applications in the field of telecommunications." In some embodiments, the wireless-power transmission systems disclosed herein comply with other requirements such as requirements codified under EN 62311: 2008, IEC/EN 662209-2: 2010, and IEC/EN 62479: 2010.

In some embodiments, the present systems and methods for wireless-power transmission incorporate various safety techniques to ensure that human occupants in or near a transmission field are not exposed to EMF energy near or above regulatory limits or other nominal limits. One safety method is to include a margin of error (e.g., about 10% to 20%) beyond the nominal limits, so that human subjects are not exposed to power levels at or near the EMF exposure limits. A second safety method can provide staged protection measures, such as reduction or termination of wireless-power transmission if humans (and in some embodiments, other living beings or sensitive objects) move toward a radiation area with power density levels exceeding EMF exposure limits. In some embodiments, these safety methods (and others) are programmed into a memory of the transmitter (e.g., memory 706) to allow the transmitter to execute such programs and implement these safety methods. In some embodiments, the safety methods are implemented by using sensors to detect a foreign object within the transmission field.

FIG. 6 is a block diagram of an RF wireless-power transmission system 650 in accordance with some embodiments. In some embodiments, the RF wireless-power transmission system 650 includes an RF power transmitter 100 (also referred to herein as a near-field (NF) charging system 100), NF power transmitter 100, RF power transmitter 100). In some embodiments, the RF power transmitter 100 includes an RF power transmitter integrated circuit 660 (described in more detail below). In some embodiments, the RF power transmitter 100 includes one or more communications components 704 (e.g., wireless communication components, such as WI-FI or BLUETOOTH radios). In some embodiments, the RF power transmitter 100 also connects to one or more power amplifier units 608-1, . . . 608-n to control operation of the one or more power amplifier units when they drive external power-transfer elements (e.g., power-transfer elements, such as transmission antennas 710-1 to 710-n). In some embodiments antennas 710-1 to 710-n are placed near elements 711-A to 711-n (also referred to as non-radiating elements 202A and 202B, and/or flipped-non-radiating elements 202A-1 and 202B-1 depending on the circumstances and desired radiation distributions to be produced by the corresponding radiating elements), respectively. In some embodiments, a single power amplifier, e.g. 608-1 is controlling one antenna 710-1. In some embodiments, RF power is controlled and modulated at the RF power transmitter 100 via switch circuitry as to enable the RF wireless-power transmission system to send RF power to one or more wireless receiving devices via the TX antenna array 710. In some embodiments, a single power amplifier, e.g. 608-n is controlling multiple antennas 710-m to 710-n through multiple splitters (610-1 to 610-n) and multiple switches (612-1 to 612-n).

In some embodiments, the communication component(s) 704 enable communication between the RF power transmitter 100 and one or more communication networks. In some embodiments, the communication component(s) 704 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document. In some instances, the communication component(s) 704 are not able to communicate with wireless-power receivers for various reasons, e.g., because there is no power available for the communication component(s) to use for the transmission of data signals or because the wireless-power receiver itself does not actually include any communication component of its own. As such, in some optional embodiments, near-field power transmitters described herein are still able to uniquely identify different types of devices and, when a wireless-power receiver is detected, figure out if that wireless-power receiver is authorized to receive wireless-power. In some embodiments, a signature-signal receiving/generating circuits are used in identifying the receivers as described in more detail below and are also described in U.S. patent application Ser. No. 16/045,637, "Systems and Methods for Detecting Wireless Power Receivers and Other Objects at a Near-Field Charging Pad," filed on Jul. 25, 2018, which is hereby incorporated by reference in its entirety.

Figure 7:
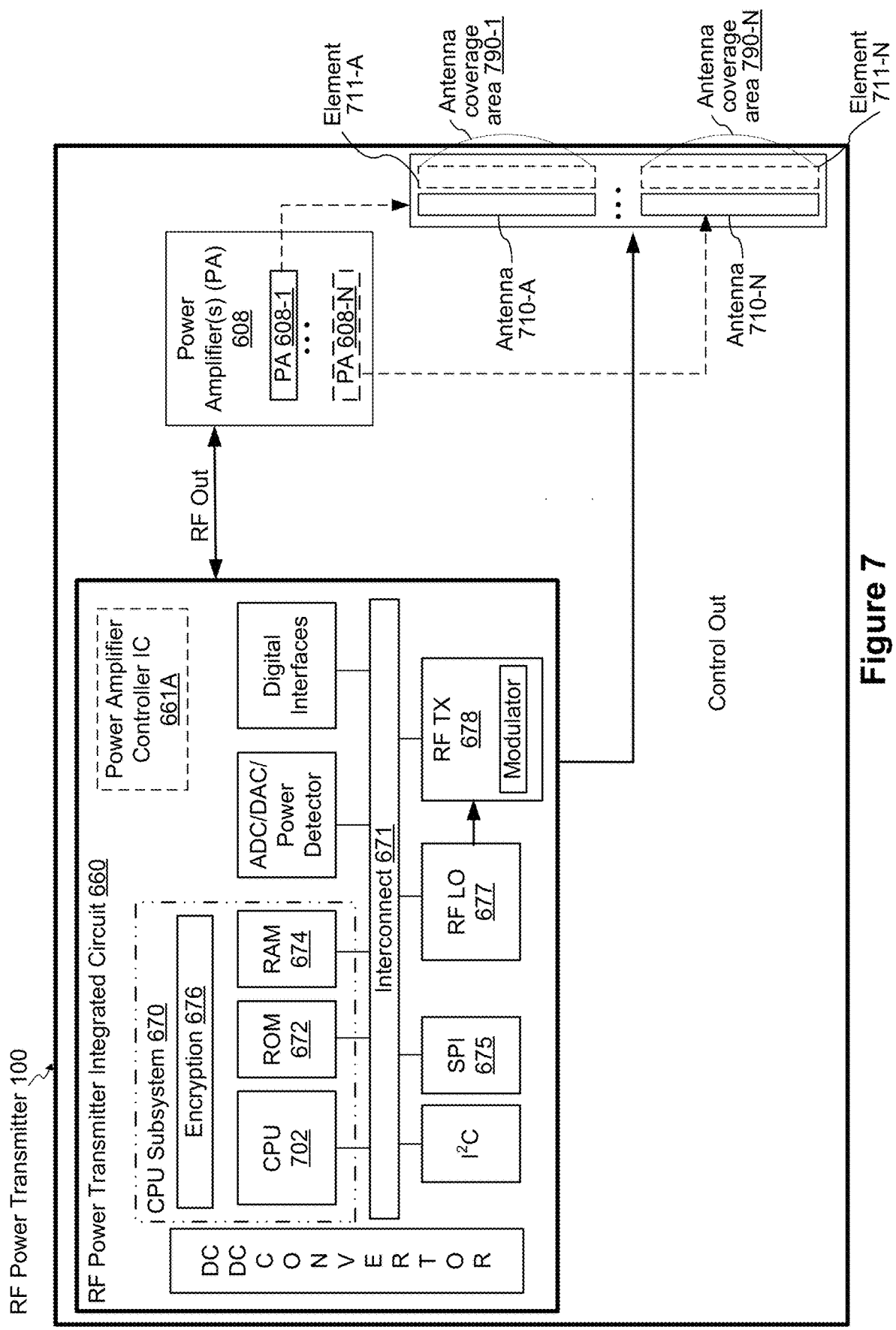
FIG. 7 is a block diagram showing components of an example RF power transmission system that includes an RF power transmitter integrated circuit and antenna coverage areas, in accordance with some embodiments.

FIG. 7 is a block diagram of the RF power transmitter integrated circuit 660 (the "RF IC") in accordance with some embodiments. In some embodiments, the RF IC 660 includes a CPU subsystem 670, an external device control interface, an RF subsection for DC to RF power conversion, and analog and digital control interfaces interconnected via an interconnection component, such as a bus or interconnection fabric block 671. In some embodiments, the CPU subsystem 670 includes a microprocessor unit (CPU) 702 with related Read-Only-Memory (ROM) 672 for device program booting via a digital control interface, e.g. an I2C port, to an external FLASH containing the CPU executable code to be loaded into the CPU Subsystem Random Access Memory (RAM) 674 or executed directly from FLASH. In some embodiments, the CPU subsystem 670 also includes an encryption module or block 676 to authenticate and secure communication exchanges with external devices, such as wireless-power receivers that attempt to receive wirelessly delivered power from the RF power transmitter 100.

In some embodiments, the RF IC 660 also includes (or is in communication with) a power amplifier controller IC 661A (PA IC) that is responsible for controlling and managing operations of a power amplifier, including for reading measurements of impedance at various measurement points within the power amplifier. The PA IC 661A may be on the same integrated circuit at the RF IC 660, or may be on its own integrated circuit that is separate from (but still in communication with) the RF IC 660. In some embodiments, the PA IC 661A is on the same chip with one or more of the Power Amplifiers (PAs) 608. In some other embodiments, the PA IC 661A is on its own chip that is a separate chip from the Power Amplifiers (PAs) 608.

In some embodiments, executable instructions running on the CPU are used to manage operation of the RF power transmitter 100 and to control external devices through a control interface, e.g., SPI control interface 675, and the other analog and digital interfaces included in the RF power transmitter integrated circuit 660. In some embodiments, the CPU subsystem 670 also manages operation of the RF subsection of the RF power transmitter integrated circuit 660, which includes an RF local oscillator (LO) 677 and an RF transmitter (TX) 678. In some embodiments, the RF LO 677 is adjusted based on instructions from the CPU subsystem 670 and is thereby set to different desired frequencies of operation, while the RF TX converts, amplifies, modulates the RF output as desired to generate a viable RF power level.

In some embodiments, the RF power transmitter integrated circuit 660 provides the viable RF power level (e.g., via the RF TX 678) directly to the one or more power amplifiers 608 and does not use any beam-forming capabilities (e.g., bypasses/disables a beam-forming IC and/or any associated algorithms if phase-shifting is not required, such as when only a single antenna 710 is used to transmit power transmission signals to a wireless-power receiver). In some embodiments, the PA IC 661A regulates the functionality of the PAs 608 including adjusting the viable RF power level to the PAs 608.

In some embodiments, the RF power transmitter integrated circuit 660 provides the viable RF power level (e.g., via the RF TX 678) directly to the one or more power amplifiers 608 and does not use a beam-forming IC. In some embodiments, by not using beam-forming control, there is no active beam-forming control in the power transmission system. For example, in some embodiments, by eliminating the active beam-forming control, the relative phases of the power signals from different antennas are unaltered after transmission. In some embodiments, by eliminating the active beam-forming control, the phases of the power signals are not controlled and remain in a fixed or initial phase.

In some embodiments, the PA IC 661A regulates the functionality of the PAs 608 including adjusting the viable RF power level to the PAs 608.

The components of the near-field charging system 100 are also used to ensure that power is transmitted safely. For example, Specific Absorption Rate (SAR) values and Electromagnetic Field (EMF) values can be used to help ensure safe transmission of wireless power. In some embodiments, the system 100 can determine the present SAR value of RF energy at one or more particular locations near the charging surfaces described herein using one or more sampling or measurement techniques. In some embodiments, the SAR values near the charging surfaces are measured and pre-determined by SAR value measurement equipment. In some implementations, the system 100 may be preloaded with values, tables, and/or algorithms that indicate for the system 100 which distance ranges are likely to exceed a pre-stored SAR threshold value. In some implementations, the system may be preloaded with values, tables, and/or algorithms that indicate for the system which radiation profiles near the charging surface are likely to exceed to a pre-stored SAR threshold value. For example, a lookup table may indicate that the SAR value for a volume of space (V) located some distance (D) from the system receiving a number of power waves (P) having a particular frequency (F). One skilled in the art, upon reading the present disclosure, will appreciate that there are any number of potential calculations, which may use any number of variables, to determine the SAR value of RF energy at a particular locations, each of which is within the scope of this disclosure.

A SAR value at or below 1.6 W/kg, is in compliance with the FCC (Federal Communications Commission) SAR requirement in the United States. A SAR value at or below 2 W/kg is in compliance with the IEC (International Electrotechnical Commission) SAR requirement in the European Union. In some embodiments, the SAR values may be measured and used by the system to maintain a constant energy level throughout the charging surfaces, where the energy level is both safely below a SAR threshold value but still contains enough RF energy for the receivers to effectively convert into electrical power that is sufficient to power an associated device, and/or charge a battery. In some embodiments, the transmitter may proactively modulate the radiation profiles based upon the energy expected to result from newly formed radiation profiles based upon the pre-determined SAR threshold values. For example, after determining how to generate or adjust the radiation profiles, but prior to actually transmitting the power, the system may determine whether the radiation profiles to be generated will result in RF energy accumulation at a particular location that either satisfies or fails the SAR threshold. Additionally or alternatively, in some embodiments, the system may actively monitor the charging surfaces to reactively adjust power waves transmitted to or through a particular location when the transmitter determines that the power waves passing through or accumulating at the particular location fail the SAR threshold. Where the system is configured to proactively and reactively adjust the power radiation profile, with the goal of maintaining a continuous power level throughout the charging surface, the system may be configured to proactively adjust the power radiation profile to be transmitted to a particular location to be certain the power waves will satisfy the SAR threshold, but may also continuously poll the SAR values at locations near the charging surfaces (e.g., using one or more sensors configured to measure such SAR values) to determine whether the SAR values for power waves accumulating at or passing through particular locations unexpectedly fail the SAR threshold.

In some embodiments, the system 100 described herein also adheres to electromagnetic field (EMF) exposure protection standards for human subjects. Maximum exposure limits are defined by US and European standards in terms of power density limits and electric field limits (as well as magnetic field limits). These include, for example, limits established by the Federal Communications Commission (FCC) for MPE, and limits established by European regulators for radiation exposure. Limits established by the FCC for MPE are codified at 47 CFR § 1.1310. For electromagnetic field (EMF) frequencies in the microwave range, power density can be used to express an intensity of exposure. Power density is defined as power per unit area. For example, power density can be commonly expressed in terms of watts per square meter (W/m2), milliwatts per square centimeter (mW/cm2), or microwatts per square centimeter (μW/cm2).

In some embodiments, and as a non-limiting example, the system disclosed herein complies with FCC Part § 18.107 requirement which specifies "Industrial, scientific, and medical (ISM) equipment. Equipment or appliances designed to generate and use locally RF energy for industrial, scientific, medical, domestic or similar purposes, excluding applications in the field of telecommunication." In some embodiments, the system disclosed herein complies with ITU (International Telecommunication Union) Radio Regulations which specifies "industrial, scientific and medical (ISM) applications (of radio frequency energy): Operation of equipment or appliances designed to generate and use locally radio frequency energy for industrial, scientific, medical, domestic or similar purposes, excluding applications in the field of telecommunications." In some embodiments, the system 100 disclosed herein comply with other requirements such as requirements codified under EN 62311: 2008, IEC/EN 662209-2: 2010, and IEC/EN 62479: 2010.

In some embodiments, the present systems and methods for wireless-power transmission incorporate various safety techniques to ensure that human occupants in or near a transmission field are not exposed to EMF energy near or above regulatory limits or other nominal limits. One safety method is to include a margin of error (e.g., about 10% to 20%) beyond the nominal limits, so that human subjects are not exposed to power levels at or near the EMF exposure limits. A second safety method can provide staged protection measures, such as reduction or termination of wireless-power transmission if humans (and in some embodiments, other living beings or sensitive objects) move toward a radiation area with power density levels exceeding EMF exposure limits. In some embodiments, these safety methods (and others) are programmed into a memory of the transmitter (not shown) to allow the transmitter to execute such programs and implement these safety methods. In some embodiments, the safety methods are implemented by using sensors to detect a foreign object within the transmission field.

Figure 8:
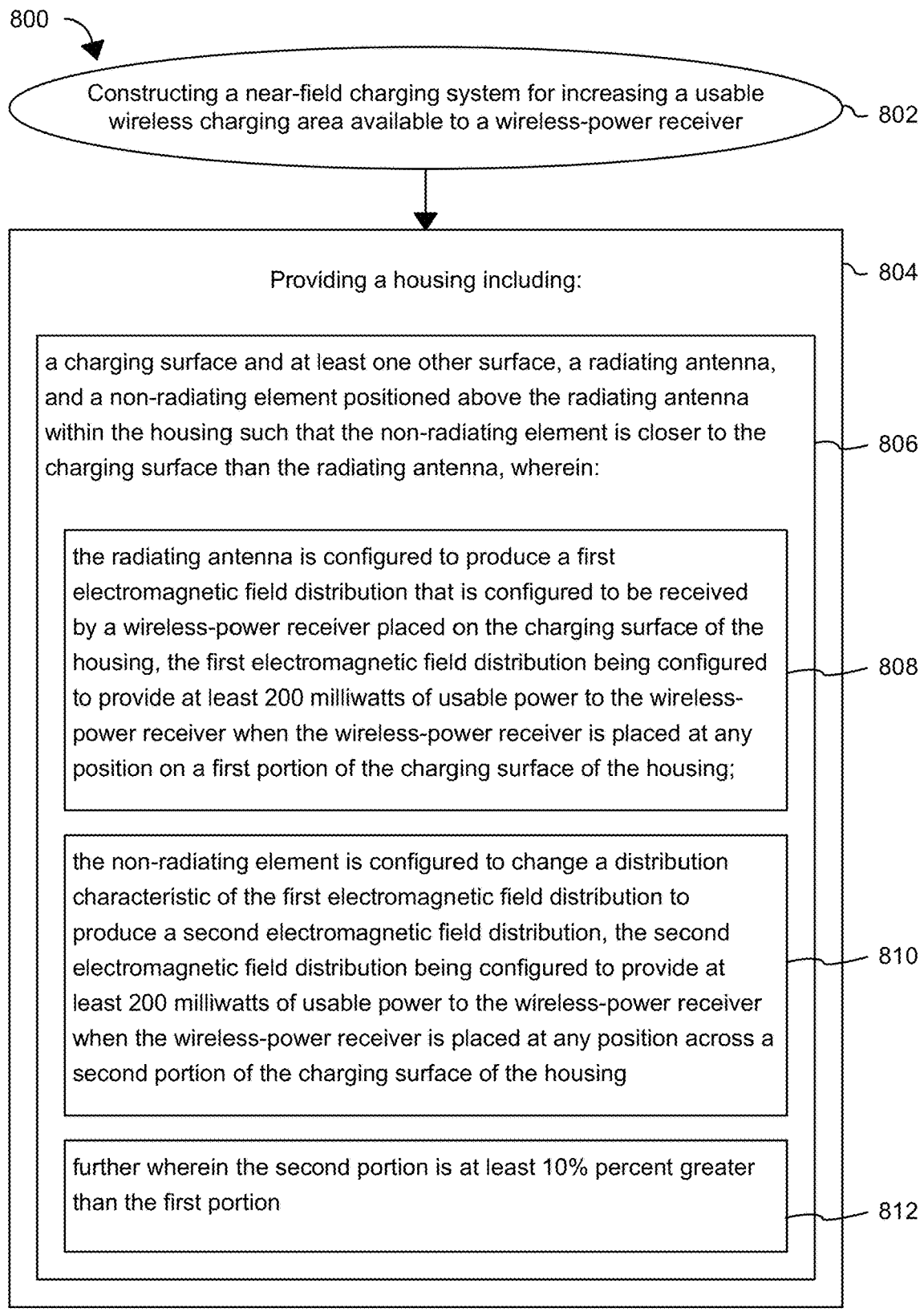
FIG. 8 is a flow diagram showing a method of constructing a near-field charging system, in accordance with some embodiments.

FIG. 8 shows a flow diagram of a method of constructing a near-field charging system, in accordance with some embodiments. In some embodiments, the method of FIG. 8 is performed by a manufacturer of near-field charging systems, or by a manufacturer of components such systems.

Specifically, FIG. 8 shows a method 800 of constructing (802) a near-field charging system for increasing a usable wireless charging area available to a wireless-power receiver. The method 800 includes providing a housing of the near-field charging system (804). The housing that is provided in operation 804 includes a charging surface and at least one other surface (806). In some embodiments, the charging surface is a top surface of the housing, such as top surface of the housing 104 depicted in FIGS. 1 and 2. The top surface includes one or more charging surfaces (e.g., charging surfaces 106A and 106B, FIGS. 1 and 2) at which a wireless-power receiver is placed to allow that receiver to receive electromagnetic energy that it can then convert into usable power for charging or powering of an electronic device coupled to the wireless-power receiver. The other surfaces can be surfaces that allow for encasing the radiating antenna (e.g., radiating antennas 204A and 204B) and the non-radiating elements (e.g., parasitic element) 202A, 202B, 202A-1, and 202B-1, but these other surfaces are not configured to allow for the wireless-power receiver to receive the electromagnetic energy. Stated another way, the radiating elements 204A and 204B and parasitic element 202A, 202B, 202A-1, and 202B-1, in some embodiments, produce electromagnetic energy that is enhanced on the charging surface, and is not configured to be available on the other surfaces).

Further, the housing that is provided in operation 804 also includes a radiating antenna (806). In some embodiments, the radiating antenna is made from a conductive material such as copper, or any other suitable radiative material. The radiating antenna is coupled to a feed line that provides an RF signal to the radiating antenna. In contrast, a non-radiating element (also referred to as a parasitic element, and discussed below) is not coupled to a feeding line. The housing also includes the non-radiating element positioned above the radiating antenna within the housing such that the non-radiating element is closer to the charging surface than the radiating antenna (806) (e.g., the non-radiating element is a parasitic element such as a conductive metal patch, an example of which is depicted in FIGS. 2, 4A, and 4B (e.g., non-radiating element 202A), and which is depicted as positioned on top of the radiating antenna 204A. In some embodiments, the parasitic element has a same shape as the radiating antenna, as is shown in FIGS. 2, 4A, and 4B).

The radiating antenna is configured to produce a first electromagnetic field distribution that is configured to be received by a wireless-power receiver placed on the charging surface (e.g., charging surfaces 106A and 106B in FIGS. 2, 4A, and 4B, which can be surfaces of the housing (e.g., housing 104) on which receiving devices may be placed. In some embodiments or circumstances, the first electromagnetic field distribution can be configured to provide at least 200 and/or a minimum of milliwatts of usable power (e.g., usable power is energy that is rectified and converted to the correct requirements for whatever type of device is receiving power or charge from the wireless-power receiver) to the wireless-power receiver when the wireless-power receiver is placed at any position on a first portion of the charging surface of the housing (808).

The non-radiating element, when placed in a position above the radiating element, is configured to change a distribution characteristic of the first electromagnetic field distribution to produce a second electromagnetic field distribution (which is distinct from the first electromagnetic field distribution), the second electromagnetic field distribution being configured to provide at least 200 milliwatts of usable power to the wireless-power receiver when the wireless-power receiver is placed at any position across a second portion of the charging surface of the housing (810).

In some circumstances, examples of the change to the distribution characteristic include, as non-limiting examples, changes to e-field distribution to lower peaks and/or valleys. To illustrate this in one example, attention is directed to FIGS. 3A and 3B. A comparison of the electric field distribution plots shown in FIG. 3A (representing the electromagnetic field distribution of the radiating antenna when the parasitic element is not present, i.e., the first electromagnetic field distribution) and FIG. 3B (representing the electromagnetic field distribution of the radiating antenna when the parasitic element is present, i.e., the second electromagnetic field distribution) shows this change in the distribution characteristics that occurs when the non-radiating element is used to alter the electromagnetic field distribution of the radiating antenna.

The second portion can be at least 10% percent greater in size than the first portion (812). As one example, the first portion of the charging surface of the housing covers an area that includes 70% of the surface area of the charging surface (e.g., as shown in FIG. 1, the dashed-line outlines labeled 110A and 110B each represent approximately 70% of the surface area of the charging surface), and the second portion of the charging surface of the housing covers an area that includes at least 80% of the surface area of the charging surface (e.g., as shown in FIG. 1, the dashed-line outlines labeled 112A and 112B each represent approximately 80% of the surface area of the charging surface). In some embodiments, the second portion covers an area of the charging surface that is at least 10% percent larger in size than the first portion. In some embodiments, the percentage can be any integer or fractional value falling between the range of 10% to 30% (e.g., 11%, 11.5%, 18%, 19.1%, 20.5, 25, etc.)

In some embodiments of the method 800, the second electromagnetic field distribution is configured to provide at least 220 milliwatts of usable power to the wireless-power receiver when the wireless-power receiver is placed at any position across the second portion of the charging surface of the housing. In other words, amount of usable power available across the second portion of the charging surface can be increased from 200 to 220 milliwatts in order to provide an amount of usable power to a receiving device with a higher power requirement. In some embodiments, 220 milliwatts provides enough power to charge one or more wireless earbuds or hearing aids.

In some embodiments of the near-field charging system, the second electromagnetic field distribution is configured to provide at least 1 watt of usable power to the wireless-power receiver when the wireless-power receiver is placed at any position across a second portion of the charging surface of the housing. In other words, amount of usable power available across the second portion of the charging surface can be increased from 200 milliwatts to 1 watt in order to provide an amount of usable power to a receiving device with a higher power requirement. In some embodiments, 1 watt provides enough power to charge a wearable electronic device such as a smartwatch.

In some embodiments of the near-field charging system, the second electromagnetic field distribution is configured to provide at least 5 watts of usable power to the wireless-power receiver when the wireless-power receiver is placed at any position across a second portion of the charging surface of the housing. In other words, amount of usable power available across the second portion of the charging surface can be increased from 200 milliwatts to 5 watts in order to provide an amount of usable power to a receiving device with a higher power requirement. In some embodiments, 5 watts provides enough power to charge a small electronic device such as a smartphone.

In some embodiments of the near-field charging system, the first portion of the charging surface of the housing covers an area that includes 70% of the surface area of the charging surface. For example, FIGS. 3B, 4A, and 4B show charging surfaces that cover 70% of the charging surface.

In some embodiments of the near-field charging system, the radiating antenna is configured to produce a first reflection coefficient, and positioning the non-radiating element above the radiating antenna within the housing such that the non-radiating element is closer to the charging surface than the radiating antenna, the radiating antenna is configured to produce a second reflection coefficient that is 75% less than the first reflection coefficient, thereby causing a reduction in return losses for the near-field charging system. In some embodiments, while the reflection coefficient becomes more invariant with the movement of the wireless receiver devices on the charging surfaces of the near-field charging system, the charging surfaces uniformity increases. In some embodiments, the second reflection coefficient is up to 20% less than the first reflection coefficient.

In some embodiments, the addition of the non-radiating element (e.g., the parasitic element) results in a reflection coefficient of the near field charging system's radiating antennas becoming more stable and far less sensitive to the relative placement and/or location of the receiver device (e.g., where the wireless-power receiver is coupled to the audio output device (e.g., a hearing aid, wireless headphones, or an earbud)). Therefore, as the receiver is moved over the surface of the transmitter antenna, the reflection coefficient does not vary as much, the return loss at the radiating antenna feed can be greatly reduced, and the power transferred to the radiating antenna is uniform and stable. This is not, however, the case for the radiating antennas without non-radiating elements placed proximate thereto. For example, when the near field charging system does not have a non-radiating element, reflection coefficient varies between −5 dB to −18 dB as the position of the receiver is varied within the charging area. This, in turn, leads to poor coupling of power in some areas where the reflection coefficient (and return loss) is high. On the other hand, when the parasitic element is added, in some embodiments, the reflection coefficient varies between −13 dB to −16 dB as the position of the receiver is varied within the charging area. In most circumstances, this is a desired result because the reflection coefficient (and return loss) is always low at the antenna feed. In some embodiments, reflection coefficient is (and in some embodiments always) less than −10 dB. Therefore, the power transferred into the radiating antenna can be uniform and stable, and is not dependent on the location of the receiver antenna.

In some embodiments of the near-field charging system, the second electromagnetic field distribution of the near-field charging system is configured to provide more than 200 milliWatts. In some embodiments, this amount of usable power is adjusted based on the requirements of the receiving device (i.e., the electronic device that is coupled to the wireless-power receiver). In some embodiments, 1 watt emitted by the system 100 can be an appropriate amount of power to charge a single wireless headphone. In some embodiments, 200 watts emitted by the near-field charging system may be an appropriate amount of power to charge a laptop device. In some embodiments, placement of the parasitic element above the radiating antenna within the housing thus causes a flattening of the resulting electromagnetic field distribution (the referenced second electromagnetic field distribution referred to herein) produced by the radiating antennas of the near-field charging system 100, such that more usable charging locations are available to the wireless-power receiver on the charging surface (e.g., locations at which the receiver is able to receive at least 200 milliWatts (or some other value depending on the circumstances and configuration of the system) of usable power), but the locations at which more than 250 milliWatts (or some other value depending on the circumstances and configuration of the system) of usable power could be received by the wireless-power receiver are reduced. Thus, in such embodiments, more usable charging locations are available overall (e.g., as depicted and explained with reference to FIG. 2, cold zone locations are reduced on the charging surfaces), but less locations of higher amounts of usable power are made available to the wireless-power receiver. Such an occurrence is evidenced by comparing FIG. 3A (which shows the electromagnetic field distribution without the non-radiating element) to FIG. 3B (which shows the electromagnetic field distribution with the non-radiating element)). In other words, in some embodiments, uniformity of charging across the charging surfaces is the most important goal, and therefore sacrificing higher power level areas to achieve uniformity is desirable.

In some embodiments, the charging surface of the near-field charging system has a depression (e.g., depressions 106A-1 and 106B-1 in FIG. 1) that is configured to receive and partially surround an audio output device, and where the wireless-power receiver is coupled to the audio output device (e.g., a hearing aid, wireless headphones, or an earbud), and the wireless power receiver is configured to provide at least 200 milliwatts of usable power to the audio output device for charging or powering purposes.

In some embodiments, the audio output device is a single in-ear audio output device (e.g., a wireless earbud or audio output device (indicated by 102A and 102B in FIG. 1), or a hearing aid, etc.).

In some embodiments, the radiating antenna has a shape (e.g., a PIFA antenna with a radiator substantially in the shape of the letter 'c,' similar to the shape depicted for radiating elements in FIGS. 2, 4A, and 4B), and the radiating antenna is oriented to have a first orientation within the housing. In embodiments in which the charging surface is a planar surface, the first orientation can be such that the largest surface of the radiating antenna is substantially coplanar with (e.g., within +/−5 degrees of coplanar with) the largest surface of the charging surface, similar to the orientation shown in FIG. 2 and FIG. 4A.); and the non-radiating element has the shape (e.g., a substantially identical shape as the radiating antenna, as shown in FIGS. 2 and 4A) and the first orientation within the housing. In some embodiments, the non-radiating element has a surface area that varies by approximately 10% relative to a surface area of the radiating antenna (e.g., the non-radiating element is either larger or smaller than the radiating antenna by 10% of its surface area).

In some embodiments, the radiating antenna has a shape (e.g., a PIFA antenna with a radiator having a 'c' shaped design, similar to the shape shown by radiating elements in FIGS. 2, 4A, and 4B) and the radiating antenna is oriented to have the first orientation (described above) within the housing; and the non-radiating element has: the same shape (e.g., an identical shape as the radiating antenna, as shown in FIG. 4A); and a second orientation within the housing that is different from the first orientation (as shown in FIG. 4B).

In some embodiments, the radiating antenna is connected to a power feed line (as shown by power feed lines 210A and 210B in FIG. 2), and the non-radiating element (e.g., the non-radiating element is a parasitic element) is not connected to a power feed line (as shown FIG. 2).

In some embodiments, a non-conducting material is placed between the radiating antenna and the non-radiating element, and the non-conducting material electrically isolates the radiating antenna from the non-radiating element (as shown by circuit board 206 in FIGS. 2, 4A, and 4B). In some embodiments, rather than use a circuit board, a dielectric can be utilized as the non-conducting material, and the radiating antennas and non-radiating elements can be in the form of stamped metal components (instead of being printed elements on a circuit board).

In some embodiments, the radiating antenna and the non-radiating element both have a same antenna design selected from the group consisting of: a PIFA antenna design, a patch antenna design, and a dipole antenna design.

In some embodiments, the non-radiating element is positioned at least 1 millimeter above the radiating antenna within the housing such that the non-radiating element is closer to the charging surface than the radiating antenna (e.g., as shown in FIG. 1 where the circuit board 206 is 1 millimeter thick). In some embodiments, the non-radiating element is positioned at least 1.5 millimeter above the radiating antenna within the housing such that the non-radiating element is closer to the charging surface than the radiating antenna. In some embodiments, the non-radiating elements are floating exactly on top of the radiating element with a one-millimeter layer of dielectric in between. In some embodiments, there is no conductive material connecting the non-radiating elements with the radiating antennas; in other words, there is no electrical connection between the radiating antennas and the non-radiating elements.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

Features of the present invention can be implemented in, using, or with the assistance of a computer program product, such as a storage medium (media) or computer readable storage medium (media) having instructions stored thereon/in which can be used to program a processing system to perform any of the features presented herein. The storage medium (e.g., memory 206, 256) can include, but is not limited to, high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory optionally includes one or more storage devices remotely located from the CPU(s) (e.g., processor(s)). Memory, or alternatively the non-volatile memory device(s) within the memory, comprises a non-transitory computer readable storage medium.

Stored on any one of the machine readable medium (media), features of the present invention can be incorporated in software and/or firmware for controlling the hardware of a processing system (such as the components associated with the transmitters 100 and/or receivers 104), and for enabling a processing system to interact with other mechanisms utilizing the results of the present invention. Such software or firmware may include, but is not limited to, application code, device drivers, operating systems, and execution environments/containers.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A near-field charging system for increasing a usable wireless charging area available to a wireless-power receiver, the near-field charging system comprising:
  a housing including:
    a charging surface and at least one other surface,
    a radiating antenna, and
    a non-radiating element positioned above the radiating antenna within the housing such that the non-radiating element is closer to the charging surface than the radiating antenna, wherein:
  the radiating antenna is configured to produce a first electromagnetic field distribution that is configured to be received by a wireless-power receiver placed on the charging surface of the housing, the first electromagnetic field distribution being configured to provide at least 200 milliwatts of usable power to the wireless-power receiver when the wireless-power receiver is placed at any position on a first portion of the charging surface of the housing;
  the non-radiating element is configured to change a distribution characteristic of the first electromagnetic field distribution to produce a second electromagnetic field distribution, the second electromagnetic field distribution being configured to provide at least 200 milliwatts of usable power to the wireless-power receiver when the wireless-power receiver is placed at any position across a second portion of the charging surface of the housing, further wherein the second portion is at least 10% percent greater than the first portion.

2. The near-field charging system of claim 1, the second electromagnetic field distribution being configured to provide at least 220 milliwatts of usable power to the wireless-power receiver when the wireless-power receiver is placed at any position across a second portion of the charging surface of the housing.

3. The near-field charging system of claim 1, the second electromagnetic field distribution being configured to provide at least 1 watt of usable power to the wireless-power receiver when the wireless-power receiver is placed at any position across a second portion of the charging surface of the housing.

4. The near-field charging system of claim 1, the second electromagnetic field distribution being configured to provide at least 5 watts of usable power to the wireless-power receiver when the wireless-power receiver is placed at any position across a second portion of the charging surface of the housing.

5. The near-field charging system of claim 1, wherein the first portion of the charging surface of the housing covers an area that includes 70% of the surface area of the charging surface.

6. The near-field charging system of claim 1, wherein:
the radiating antenna is configured to produce a first reflection coefficient, and positioning the non-radiating element above the radiating antenna within the housing such that the non-radiating element is closer to the charging surface than the radiating antenna, the radiating antenna is configured to produce a second reflection coefficient that is 12% less than the first reflection coefficient, thereby causing a reduction in return losses for the near-field charging system.

7. The near-field charging system of claim 6, wherein the second reflection coefficient varies between −13 dB and −16 dB.

8. The near-field charging system of claim 6, wherein the second reflection coefficient is less than −10 dB.

9. The near-field charging system of claim 1, the second electromagnetic field distribution being configured to provide more than 200 milliwatts of usable power to the wireless-power receiver at fewer locations on the charging surface of the housing relative to the first electromagnetic field distribution.

10. The near-field charging system of claim 1, wherein the charging surface has a depression configured to receive and partially house an audio output device, and further wherein the wireless-power receiver is coupled to the audio output device, and the wireless power receiver is configured to provide the at least 200 milliwatts of usable power to the audio output device for charging or powering purposes.

11. The near-field charging system of claim 10, wherein the audio output device is a single in-ear audio output device.

12. The near-field charging system of claim 1, wherein:
the radiating antenna has a shape, and the radiating antenna is oriented to have a first orientation within the housing; and
the non-radiating element has the shape and the first orientation within the housing.

13. The near-field charging system of claim 1, wherein:
the radiating antenna has a shape and the radiating antenna is oriented to have a first orientation within the housing;
the non-radiating element has:
the same shape; and
a second orientation within the housing that is different from the first orientation.

14. The near-field charging system of claim 1, wherein the radiating antenna is connected to a power feed line, and the non-radiating element is not connected to a power feed line.

15. The near-field charging system of claim 1, wherein a non-conducting material is placed between the radiating antenna and the non-radiating element, wherein the non-conducting material electrically isolates the radiating antenna from the non-radiating element.

16. The near-field charging system of claim 1, wherein the radiating antenna and the non-radiating element both have a same radiating antenna design selected from the group consisting of: a PIFA antenna design, a patch antenna design, and a dipole antenna design.

17. The near-field charging system of claim 1, wherein the non-radiating element is positioned at least 1 millimeter above the radiating antenna within the housing such that the non-radiating element is closer to the charging surface than the radiating antenna.

18. A method of constructing a near-field charging system that increases usable wireless charging area available to a wireless-power receiver, the method comprising:
providing a housing that includes a charging surface and at least one other surface;
placing a radiating antenna within the housing, the radiating antenna configured to produce a first electromagnetic field distribution that is configured to be received by a wireless-power receiver placed on the charging surface of the housing, the first electromagnetic field distribution being configured to provide at least 200 milliwatts of usable power to the wireless-power receiver when the wireless-power receiver is placed at any position on a first portion of the charging surface of the housing;
placing a non-radiating element in a position above the radiating antenna within the housing such that the non-radiating element is closer to the charging surface than the radiating antenna, wherein placing the non-radiating element in the position above the radiating antenna within the housing changes a distribution characteristic of the first electromagnetic field distribution to produce a second electromagnetic field distribution, the second electromagnetic field distribution being configured to provide at least 200 milliwatts of usable power to the wireless-power receiver when the wireless-power receiver is placed at any position across a second portion of the charging surface of the housing, wherein the second portion is at least 10% percent greater than the first portion.

\* \* \* \* \*